US012798426B2

(12) United States Patent
Shin

(10) Patent No.: US 12,798,426 B2
(45) Date of Patent: Nov. 17, 2026

(54) DEVICE AND METHOD FOR MUTUAL AUTHENTICATION FOR ELECTRIC VEHICLE CHARGING

(71) Applicants: Hyundai Motor Company, Seoul (KR); Kia Corporation, Seoul (KR); MYONGJI UNIVERSITY INDUSTRY AND ACADEMIA COOPERATION FOUNDATION, Yongin (KR)

(72) Inventor: Min Ho Shin, Yongin (KR)

(73) Assignees: Hyundai Motor Company, Seoul (KR); Kia Corporation, Seoul (KR); Myongji University Industry and Academia Cooperation Foundation, Yongin (KR)

( * ) Notice: Subject to any disclaimer, the term of this patent is extended or adjusted under 35 U.S.C. 154(b) by 889 days.

(21) Appl. No.: 18/126,788

(22) PCT Filed: Sep. 28, 2021

(86) PCT No.: PCT/KR2021/013249
§ 371 (c)(1),
(2) Date: Mar. 27, 2023

(87) PCT Pub. No.: WO2022/065989
PCT Pub. Date: Mar. 31, 2022

(65) Prior Publication Data

US 2024/0010095 A1 Jan. 11, 2024

Related U.S. Application Data

(60) Provisional application No. 63/084,134, filed on Sep. 28, 2020.

(30) Foreign Application Priority Data

Sep. 28, 2021 (KR) ........................ 10-2021-0128064

(51) Int. Cl.
*B60L 53/66* (2019.01)
*B60L 53/34* (2019.01)
(Continued)

(52) U.S. Cl.
CPC ............... *B60L 53/66* (2019.02); *B60L 53/34* (2019.02); *B60L 53/65* (2019.02); *B60L 53/68* (2019.02);
(Continued)

(58) Field of Classification Search
CPC ...... B60L 2240/72; B60L 53/34; B60L 53/65; B60L 53/66; B60L 53/68; G06Q 20/145;
(Continued)

(56) References Cited

U.S. PATENT DOCUMENTS

2003/0014629 A1 * 1/2003 Zucchererato ........... H04L 9/3268 713/156
2013/0038424 A1 * 2/2013 Katar .................. H02J 13/1321 340/5.8
(Continued)

FOREIGN PATENT DOCUMENTS

KR 2016-0099922 A 8/2016
KR 2018-0003996 A 1/2018
(Continued)

OTHER PUBLICATIONS

Berman, Bradley. "The ISO standard for electric-vehicle ăPlug-and-Chargea faces security concerns." by SAE International. Retrieved on 4 (2020): 2020. (Year: 2020).*
(Continued)

*Primary Examiner* — Michael Simitoski
(74) *Attorney, Agent, or Firm* — Fox Rothschild LLP

(57) ABSTRACT

A mutual authentication method allows an electric vehicle (EV) to perform plug-and-charge (PnC) charging through communication with a charging station (CS) device. The
(Continued)

mutual authentication method includes: accepting an SECC certificate chain including an SECC certificate and at least one charging device-based sub-certificate used for generation of the SECC certificate; verifying the SECC certificate by using the at least one charging device-based sub-certificate and a first root certificate; transmitting a verification result of the SECC certificate to the CS device, and providing the CS device with an EV certificate chain including an EV certificate for the EV and at least one EV-based sub-certificate used for generation of the EV certificate; accepting a verification result of the EV certificate from the CS device and generating a symmetric key; and transmitting or receiving an encrypted message to or from the CS device by using the symmetric key.

15 Claims, 9 Drawing Sheets

(51) Int. Cl.

| | |
|---|---|
| ***B60L 53/65*** | (2019.01) |
| ***B60L 53/68*** | (2019.01) |
| ***H04L 9/08*** | (2006.01) |
| ***H04L 9/32*** | (2006.01) |

(52) U.S. Cl.
CPC .......... *H04L 9/0822* (2013.01); *H04L 9/0825* (2013.01); *H04L 9/3247* (2013.01); *H04L 9/3265* (2013.01); *H04L 9/3273* (2013.01); *B60L 2240/72* (2013.01)

(58) Field of Classification Search
CPC ............... G06Q 20/18; G06Q 20/3821; G06Q 20/38215; G06Q 20/3827; G06Q 20/409; G06Q 50/06; G06Q 50/26; G07F 15/005; H04L 9/0822; H04L 9/0825; H04L 9/3247; H04L 9/3265; H04L 9/3273; Y02T 10/70; Y02T 10/7072; Y02T 90/12; Y02T 90/16; Y04S 40/20
See application file for complete search history.

(56) References Cited

U.S. PATENT DOCUMENTS

| | | | | |
|---|---|---|---|---|
| 2018/0001776 | A1* | 1/2018 | Kim | B60L 53/14 |
| 2020/0089909 | A1* | 3/2020 | Kim | G06F 21/44 |
| 2020/0282859 | A1* | 9/2020 | Shin | B60L 53/66 |
| 2021/0399566 | A1* | 12/2021 | Visvesha | B60L 53/65 |
| 2024/0380612 | A1* | 11/2024 | Shin | H04L 9/0825 |

FOREIGN PATENT DOCUMENTS

| | | | | | |
|---|---|---|---|---|---|
| KR | 20200000960 | A | * | 1/2020 | H04L 63/18 |
| KR | 2020-0091142 | A | | 7/2020 | |
| KR | 20200106826 | A | * | 9/2020 | B60L 53/305 |
| KR | 20210037201 | A | * | 4/2021 | G06V 20/625 |
| WO | WO-2020222516 | A1 | * | 11/2020 | H04L 9/3265 |
| WO | WO-2021031061 | A1 | * | 2/2021 | H04L 63/0823 |

OTHER PUBLICATIONS

Buschlinger, Lucas, Markus Springer, and Maria Zhdanova. "Plug-and-patch: Secure value added services for electric vehicle charging." Proceedings of the 14th International Conference on Availability, Reliability and Security. 2019. (Year: 2019).*

Klapwijk, Paul, and Lonneke Driessen-Mutters. "Exploring the public key infrastructure for ISO 15118 in the EV charging ecosystem." ElaadNL: Arnhem, The Netherlands (2018). (Year: 2018).*

Open Charge Alliance. "Using ISO 15118 Plug & Charge with OCPP 1.6", Sep. 16, 2020. (Year: 2020).*

SSL.com. "Authenticating Users and IoT Devices with Mutual TLS", Sep. 2020. Retrieved from <https://www.ssl.com/blogs/authenticating-users-and-iot-devices-with-mutual-tls/>. (Year: 2020).*

Vaidya, Binod, and Hussein T. Mouftah. "Multimodal and multi-pass authentication mechanisms for electric vehicle charging networks." 2020 International Wireless Communications and Mobile Computing (IWCMC). IEEE, 2020. (Year: 2020).*

Lim You Seok et al. KR 20200000960 A (machine translation), published Jan. 6, 2020. (Year: 2020).*

Shin Min Ho. KR 20200106826 A (machine translation), published Sep. 15, 2020. (Year: 2020).*

Lim You Seok et al. KR 20210037201 A (machine translation), published Apr. 6, 2021. (Year: 2021).*

Shin, Min Ho. WO 2020222516 A1 (machine translation), published Nov. 5, 2020. (Year: 2020).*

"Road Vehicles—Vehicle-to-Grid Communication Interface—Part 2: Network and Application Protocol Requirements", International Standard, ISO 15118-2:2014 (E), First Edition, 350 pages.

"Secure Transport Mutual Authentication", Submitted to: Device Management Working Group, Sep. 14, 2024, OMA-DM-2004-0216-Mutual-Authentication, 10 pages.

Lee et al., "A Study on the Application of Cross-Certification Technology for the Automatic Authentication of Charging Users in ISO 15118 Standard", The Journal of Society for e-Business Studies 25(2), May 2020, 1-14(14 pages).

* cited by examiner

DEVICE AND METHOD FOR MUTUAL AUTHENTICATION FOR ELECTRIC VEHICLE CHARGING

CROSS-REFERENCE TO RELATED APPLICATIONS

The present application is a U.S. National Phase application 35 U.S.C. § 371 of International Application No. PCT/KR2021/013249 filed on Sep. 28, 2021, which claims under 35 U.S.C. § 119 (e) the benefit of U.S. Provisional Application No. 63/084,134 filed on Sep. 28, 2020 and Korean Patent Application No. 10-2021-0128064 filed on Sep. 28, 2021, the entire contents of which are incorporated by reference herein. under

BACKGROUND

1. Technical Field

The present disclosure relates to an apparatus and method for automatically authenticating an electric vehicle charging user, more particularly, to the apparatus and method for automatically authenticating the electric vehicle charging user by mutual authentication between an electric vehicle and a charging station.

2. Description of the Related Art

An electric vehicle (EV) is driven by an electric motor powered by a battery and has advantages of reducing pollutants such as exhaust gas and noise, less breakdown, longer life, and simpler driving operation compared with a conventional combustion engine vehicle. An electric vehicle charging system may be defined as a system that charges a battery mounted in an electric vehicle using electric power obtained from a commercial power grid or stored in an energy storage device. Such an electric vehicle charging system may be implemented in various forms. For example, the electric vehicle charging system may include a conductive charging system using a cable or a non-contact wireless power transfer system.

A charging station starts the charging for an EV after performing an authentication process. However, the authentication process varies depending on a charging infrastructure and functionalities of the EV. ISO 15118-1 which is one of the international standards for the EV charging specifies two authentication methods: a PnC mechanism allowing an automatic authentication and payment using a Contract Certificate stored in the EV, and an authentication using external identification means (EIM) such as a credit card, a debit card, cash, or a smartphone application. The PnC mechanism refers to a plug-and-charge scheme by which the authentication and charging are performed by simply inserting a plug between the EV and the charging station while referring to a park-and-charging scheme by which the authentication and charging are performed by simply parking the vehicle over a charging spot of the charging station.

In order for an EV to use a plug-and-charge (PnC) service, the EV owner who wishes to charge the EV by the PnC service has to execute a service use contract with a Mobility Operator (MO). After contract execution, the Contract Certificate is installed in the EV at the time of an initial charging. Afterwards, the EV may receive the PnC-based charging service from charging stations associated with the MO. The Contract Certificate is used to verify the identity of the EV owner and provides a basis for the charging station operator to bill the EV owner a charging fee.

An EV to be charged by the PnC service from a charging station transmits and receives messages in a state that a secure connection is established. The secure connection between the EV and the charging station may be divided generally into two steps. In a first step, the EV verifies that the charging station is trustworthy based on a certificate of the charging station. If the EV determines that the charging station is trustworthy, the EV establishes a secure connection with the charging station in a second step. With a secure connection established, the EV and charging station exchange encrypted messages.

In the conventional PnC scheme, however, the EV unilaterally verifies the certificate of the charging station, but the charging station does not verify the identity of the EV. If the charging station does not check the identity of the EV, a device other than a legitimate EV qualified to use the service may perform an illegal attack such as an on-path attack, a spoofing attack, or a credential stuffing to open an illegal ISO 15118 session and withdraw energy from the charging station. In addition, while a charging session between the EV and the charging station is paused, an attacker who knows the session ID of the paused session may steal energy from the charging station by hijacking the paused session.

SUMMARY

An authentication apparatus and method are configured to enhance security while a secure channel for plug-and-charge (PnC) charging is being established between an electric vehicle and a charging station.

A mutual authentication method according to an aspect of the present disclosure may be performed in an electric vehicle (EV) to enable PnC charging through communication with a charging station (CS) device. The mutual authentication method includes: receiving, from the CS device, a supply equipment communication controller (SECC) certificate chain including a SECC Certificate and at least one charging device series SubCA Certificate used to issue the SECC Certificate; authenticating an SECC by verifying the SECC Certificate using the at least one charging device series SubCA Certificate and a first RootCA Certificate stored in a storage of the EV; sending a verification result for the SECC Certificate to the CS device and providing the CS device with an EV certificate chain including an EV Certificate of the EV and at least one EV series SubCA Certificate used to issue the EV Certificate; receiving a verification result for the EV Certificate from the CS device and generating a symmetric key through a handshake with the CS device; and transmitting and receiving messages encrypted by the symmetric key to and from the CS device.

The operation of receiving, from the CS device, the SECC certificate chain may include: providing the CS device with a list of at least some RootCA Certificates maintained in the EV. The SECC Certificate may be authenticated by using the first RootCA Certificate included in the list as a trust anchor.

The at least one EV series SubCA Certificate may be a certificate issued based on an OEM RootCA Certificate issued by an Original Equipment Manufacturer (OEM) RootCA.

The verification result for the EV Certificate may be determined in the CS device by verifying the EV certificate using the at least one EV series SubCA Certificate along with a V2G RootCA Certificate or the OEM RootCA Certificate stored in a storage of the CS device.

A mutual authentication method according to another aspect of the present disclosure may be performed in a charging station (CS) device configured to charge an electric vehicle (EV) to allow PnC charging of the EV. The mutual authentication method includes: providing the EV with a supply equipment communication controller (SECC) certificate chain including a SECC Certificate and at least one charging device series SubCA Certificate used to issue the SECC Certificate; receiving, from the EV, a verification result for the SECC Certificate and an EV certificate chain including an EV Certificate of the EV and at least one EV series SubCA Certificate used to issue the EV Certificate, and authenticating the EV by verifying the EV Certificate using the at least one EV series SubCA Certificate and a first RootCA Certificate stored in a storage of the CS device; generating a symmetric key through a handshake with the EV; and transmitting and receiving messages encrypted by the symmetric key to and from the EV.

The operation of authenticating the EV may include: receiving a list of at least some of RootCA Certificates maintained in the EV. The SECC Certificate may be authenticated by using the first RootCA Certificate included in the list as a trust anchor.

The at least one EV series SubCA Certificate may be a certificate issued based on an Original Equipment Manufacturer (OEM) RootCA Certificate issued by an OEM RootCA.

The verification result for the SECC Certificate may be determined in the EV by verifying the SECC certificate using the at least one charging device series SubCA Certificate and a V2G RootCA Certificate stored in a storage of the EV.

During the operation of authenticating the EV, the operation of verifying the EV Certificate and the mutual authentication between the EV and the CS device may be performed only when the EV certificate chain is received from the EV. When the EV certificate chain is not received from the EV, the verification of the EV Certificate may not be performed while a verification of the SECC Certificate is performed by the EV so that a one-way transport layer security (TLS) may proceed.

The mutual authentication method may further include: in response to a service request from the EV after the mutual authentication, allowing a service requested by the EV to be authorized by skipping an EV identification in an application layer based on a result of the mutual authentication.

When the EV certificate chain is not received from the EV, a communication with the EV may be terminated without generating the symmetric key and transmitting and receiving messages encrypted by the symmetric key to and from the EV.

According to yet another aspect of the present disclosure, a charging station (CS) device provides PnC charging to an electric vehicle (EV) through communication with the EV. The charging station device includes: a memory having program instructions stored therein; and a processor coupled to the memory and configured to execute the program instructions stored in the memory. The program instructions, when executed by the processor, are configured to cause the processor to: provide the EV with a supply equipment communication controller (SECC) certificate chain including a SECC Certificate and at least one charging device series SubCA Certificate used to issue the SECC Certificate; receive, from the EV, a verification result for the SECC Certificate and an EV certificate chain including an EV Certificate of the EV and at least one EV series SubCA Certificate used to issue the EV Certificate, and authenticate the EV by verifying the EV Certificate using the at least one EV series SubCA Certificate and a first RootCA Certificate stored in a storage of the CS device; generate a symmetric key through a handshake with the EV; and transmit and receive messages encrypted by the symmetric key to and from the EV.

The program instructions configured to cause the processor to authenticate the EV may include instructions configured to cause the processor to receive a list of at least some of RootCA Certificates maintained in the EV. The SECC Certificate may be authenticated by using the first RootCA Certificate included in the list as a trust anchor.

The at least one EV series SubCA Certificate may be a certificate issued based on an Original Equipment Manufacturer (OEM) RootCA Certificate issued by an OEM RootCA.

The verification result for the SECC Certificate may be determined in the EV by verifying the SECC certificate using the at least one charging device series SubCA Certificate and a V2G RootCA Certificate stored in a storage of the EV.

The program instructions configured to cause the processor to authenticate the EV may further cause the processor to verify the EV Certificate and the mutual authentication between the EV and the CS device only when the EV certificate chain is received from the EV. When the EV certificate chain is not received from the EV, the program instructions may cause the processor not to perform the verification of the EV Certificate while the verification of the SECC Certificate is performed by the EV so that a one-way TLS may proceed.

The program instructions may be further configured to perform an operation of receiving a Contract Certificate encrypted using the symmetric key from the EV. The program instructions may cause the processor to enables an authorization of a service requested by the EV based on a result of the mutual authentication in a case where the mutual authentication between the EV and the CS device is performed. When the one-way TLS is performed between the EV and the CS device, the program instructions may cause the processor to authorize the service for the EV by using the Contract Certificate.

The program instructions may be further configured to cause the processor to authenticate the EV may include program instructions causing the processor to: allow a service requested by the EV to be authorized, in response to a service request from the EV after the mutual authentication, by skipping an EV identification in an application layer based on a result of the mutual authentication.

The program instructions may be further configured to cause the processor to, when the EV certificate chain is not received from the EV, terminating a communication with the EV without generating the symmetric key and transmitting and receiving messages encrypted by the symmetric key to and from the EV.

According to an embodiment of the present disclosure, the electric vehicle and the charging station may provide their certificates to the other party and verify the certificate received from the other party during an establishment of a secure channel between the electric vehicle and the charging station for the PnC charging, and thus a mutual authentication may be carried out. Accordingly, the security in the message exchange between the electric vehicle and the charging station may be enhanced, and any access of an illegal entity to the charging station may be blocked to prevent the energy theft.

BRIEF DESCRIPTION OF THE DRAWINGS

In order that the disclosure may be well understood, there will now be described various forms thereof, given by way of example, reference being made to the accompanying drawings, in which.

Figure 1:
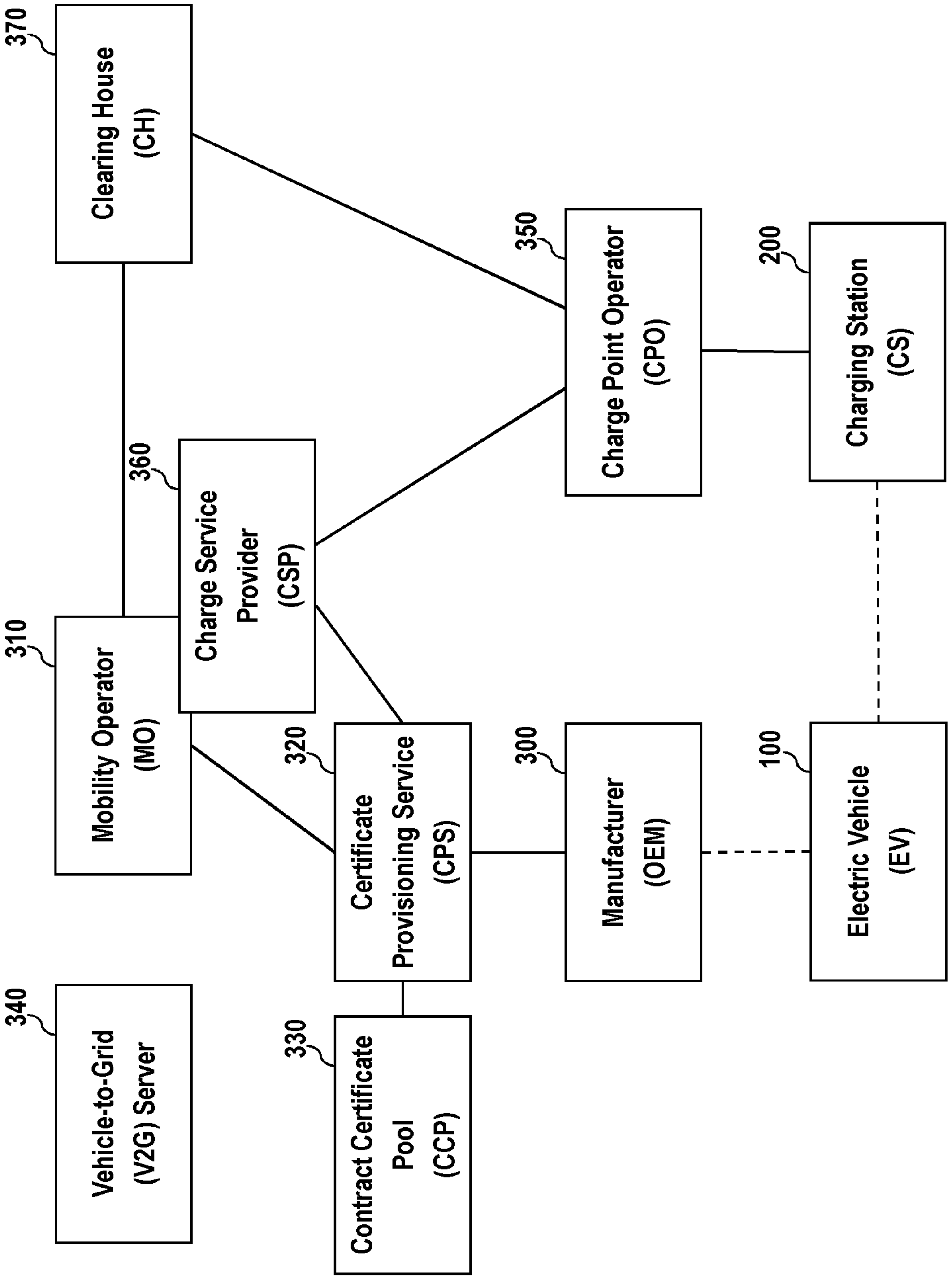
FIG. 1 is a block diagram of an electric vehicle (EV) charging infrastructure according to an exemplary embodiment of the present disclosure.

The drawings described herein are for illustration purposes only and are not intended to limit the scope of the present disclosure in any way.

DETAILED DESCRIPTION

For a more clear understanding of the features and advantages of the present disclosure, exemplary embodiments of the present disclosure will be described in detail with reference to the accompanied drawings. However, it should be understood that the present disclosure is not limited to particular embodiments and includes all modifications, equivalents, and alternatives falling within the idea and scope of the present disclosure. In describing each drawing, similar reference numerals have been used for similar components.

The terminologies including ordinals such as "first" and "second" designated for explaining various components in this specification are used to discriminate a component from the other ones but are not intended to be limiting to a specific component. For example, a second component may be referred to as a first component and, similarly, a first component may also be referred to as a second component without departing from the scope of the present disclosure. The expression "and/or" may be used to refer to a combination of a plurality of listed items or any of the plurality of listed items.

When a component is referred to as being "connected" or "coupled" to another component, the component may be directly connected or coupled logically or physically to the other component or indirectly through an object therebetween. Contrarily, when a component is referred to as being "directly connected" or "directly coupled" to another component, it is to be understood that there is no intervening object between the components.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless defined otherwise, all terms used herein, including technical or scientific terms, have the same meaning as commonly understood by those of ordinary skill in the art to which the present disclosure pertains. Terms such as those defined in a commonly used dictionary should be interpreted as having meanings consistent with meanings in the context of related technologies and should not be interpreted as having ideal or excessively formal meanings unless explicitly defined in the present application.

Terms used in the present disclosure are defined as follows.

"Electric Vehicle (EV)": An automobile, as defined in 49 CFR 523.3, intended for highway use, powered by an electric motor that draws current from an on-vehicle energy storage device, such as a battery, which is rechargeable from an off-vehicle source, such as residential or public electric service or an on-vehicle fuel powered generator. The EV may be a four or more wheeled vehicle manufactured for use primarily on public streets or roads. The EV may include an electric vehicle, an electric automobile, an electric road vehicle (ERV), a plug-in vehicle (PV), an electromotive vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

"Plug-in Electric Vehicle (PEV)": An Electric Vehicle that recharges the on-vehicle primary battery by connecting to the power grid.

"Wireless power charging system (WCS)": A system for wireless power transfer and control of interactions including operations for an alignment and communications between a ground assembly (GA) and a vehicle assembly (VA).

"Wireless power transfer (WPT)": A transfer of electric power between a power source such as a utility and the power grid and the EV through a contactless channel.

"Utility": A set of systems which supply electrical energy and include a customer information system (CIS), an advanced metering infrastructure (AMI), rates and revenue system, etc. The utility may provide an EV with energy according to a rates table and through discrete events. Also, the utility may provide information related to certification on EVs, interval of power consumption measurements, and fee.

"Smart charging": A system in which an electric vehicle supply equipment (EVSE) and/or a PEV communicate with the power grid to optimize a charging ratio or a discharging ratio of an EV by taking into account the capacity allowed by the power grid or the fee for the electricity.

"Interoperability": A state in which components of a system interwork with corresponding components of the system to perform operations aimed by the system. Additionally, information interoperability may refer to capability that two or more networks, systems, devices, applications, or components may efficiently share and easily use information without causing inconvenience to users.

"Inductive charging system": A system transferring energy from a power source to an EV via a two-part gapped core transformer in which the two halves of the transformer, i.e., primary and secondary coils, are physically separated from one another. In the present disclosure, the inductive charging system may correspond to an EV power transfer system.

"Inductive coupling": A magnetic coupling between two coils. One of the two coils may be referred to as the ground assembly (GA) coil, and the other one of the two coils may be referred to as the vehicle assembly (VA) coil.

"Original Equipment Manufacturer (OEM)": A server operated by a producer who manufactures the EV and may refer to a Root Certification Authority (RootCA) issuing an OEM RootCA Certificate.

"Mobility Operator (MO)": A service provider with which the EV owner has a contract for services related to the EV operation such as a charging, authorization, and billing to enable an EV driver may charge the EV in the charging station.

"Charging station (CS)": A facility equipped with one or more electric vehicle supply equipment's (EVSEs) and physically performing the charging to the EVs.

"Charge point operator (CPO)": An entity managing electricity to provide a requested energy transfer service.

"Charging station operator (CSO)": An entity managing electricity to provide a requested energy transfer service. The charging station operator may be a term having a same meaning as a charge point operator (CPO).

"Charge Service Provider (CSP)": An entity managing and authenticating EV user's credentials and providing the billing and other value-added services to customers. The CSP may be considered as a special type of the mobility operator (MO) and may be integrated with the MO.

"Clearing House (CH)": An entity handling cooperation between the MOs, CSPs, and CSOs. In particular, the clearing house may perform a role of an intermediate actor facilitating authorization, billing, and settling procedure for the EV charging service roaming, between two clearing parties.

"Roaming": Information changes and a scheme and provisions between CSPs, which allows EV users to access the charging services provided by multiple CSPs or CSOs pertaining to multiple e-mobility networks by using a single credential and contract.

"Credential": A physical or digital asset representing an identity of an EV or EV owner, and may include a password used to verify the identity, a public key and private key pair used in a public key encryption algorithm, a public key certificate issued by a certification authority, information related to a trusted root certification authority.

"Certificate": An electronic document binding a public key to an ID by a digital signature.

"Service session": A collection of services around a charge point related to the charging of an EV assigned to a specific customer in a specific timeframe with a unique identifier.

"Vehicle-to-Grid charging loop" or "V2G charging loop": A message transmission and reception process for controlling a charging process according to ISO 15118 standard.

"Renegotiation": A message exchange process of retransmitting parameters between the EV and the EVSE during a V2G communication session to update an agreement on a charging schedule.

"e-Mobility Account Identifier (eMAID)": A unique identifier of an EV that links a Contract Certificate for the EV to a payment account of the EV owner.

"V2G Transfer Protocol (V2GTP)": A communication protocol for transmitting V2G messages between two V2GTP entities.

"V2GTP entity": A V2G entity supporting a V2G transport protocol.

"EVPnC": A process of identifying and verifying the EV and authorizing the EV charging by a PnC method by using an EV Certificate issued to the EV regardless of a contract with the MO instead of a Contract Certificate issued based on a contract between the EV owner and the MO.

"Mutual TLS": A process in which the EV and the charging station establish a secure connection session after mutually verifying certificates possessed by the other party based on a certificate chain provided by the other party according to the present disclosure.

Exemplary embodiments of the present disclosure will now be described in detail with reference to the accompanying drawings.

Figure 2:
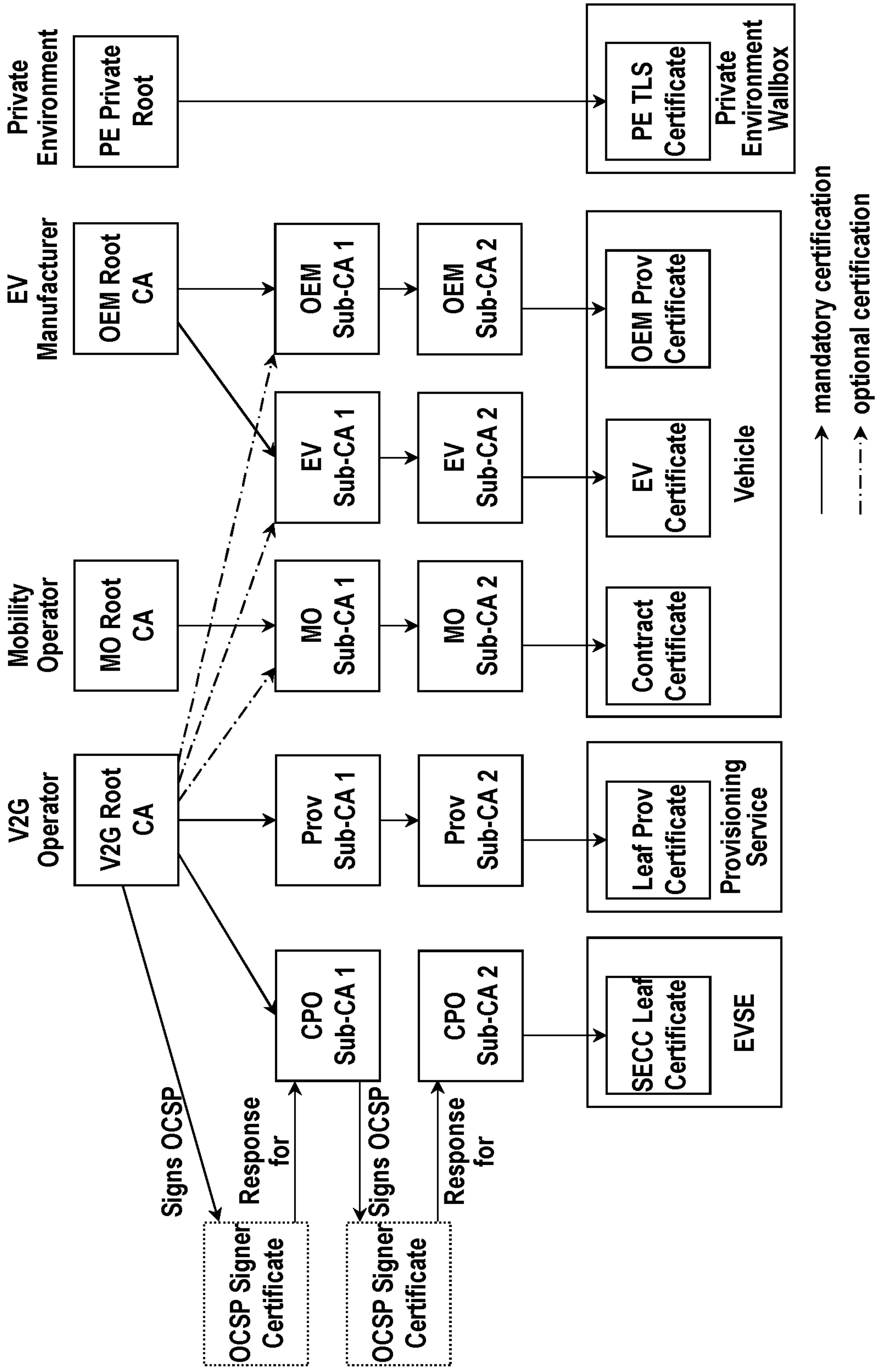
FIG. 2 is an example of a certificate hierarchy applicable to an exemplary embodiment of the present disclosure.

FIG. 1 is a block diagram of an electric vehicle (EV) charging infrastructure according to an exemplary embodiment of the present disclosure and shows entities related to the EV charging. FIG. 2 shows a certificate hierarchy applicable to an exemplary embodiment of the present disclosure.

The EV charging infrastructure of FIG. 1, which may support a charging service to the EV 100, includes a charging station (CS) 200, an original equipment manufacturer (OEM) server 300, a mobility operator (MO) 310, and a certificate provisioning service (CPS) 320, a contract certificate pool (CCP) 330, a vehicle-to-grid (V2G) server 340, a charge point operator (CPO) 350, a charge service provider (CSP) 360, and a clearing house (CH) 370.

The EV charging infrastructure may enable to implement a Vehicle-to-Grid Integration (VGI) system which allows not only to charge a battery of the EV 100 with electrical energy supplied from the power grid, but also to supply the electrical energy stored in the battery of the EV 100 to the power grid or a specific building or a device electrically connected to the power grid. An EV user may charge the EV 100 at the charging station 200 using a plug-and-charge (PnC) method. In the charging process, the EV 100 and the charging station 200 act as primary actors while the OEM server 300, the MO 310, the CPS 320, the CCP 330, and the V2G server 340, the CPO 350, the CSP 360, and the CH 370 may act as secondary actors.

The EV 100 refers to a general electric vehicle including a plug-in hybrid electric vehicle (PHEV) and can be charged by a conductive charging or a wireless power transfer at the charging station 200. The charging station (CS) 200 actually performs charging for the EV 100. The charging station 200 may be equipped with one or more EV Supply Equipment (EVSEs), and each EVSE may include at least one conductive charger and/or wireless charging spot that actually transmits power. The charging stations 200 may be a dedicated commercial charging area. Also, the charging station 200 may be located at various places such as a parking lot of the EV owner's house, a parking lot allocated for the EV charging at a gas station, and a parking area of a shopping center or an office building, for example. The charging station 200 may also be referred to as a 'charging point', 'EV charging station', 'electric charging point', or 'electronic charging station (ECS)'.

The original equipment manufacturer (OEM) 300 may refer to an electric vehicle manufacturer or an OEM server for authenticating an electric vehicle and providing various information. In particular, with respect to the certificates, the OEM may refer to an OEM Root Certification Authority that issues an OEM RootCA Certificate.

The mobility operator (MO) 310 is a service provider having a contractual engagement with the EV owner for services related to the EV operation such as the charging, authorization, and billing to enable the EV driver may charge the EV in the charging station 200. In order for the EV 100 to receive the charging service from a current charging station 200, it is required that the charging station 200 belongs to the MO 310 or support a roaming scenario. The MO 310 may be operated by an electricity supplier or an electricity wholesaler, for example. The MO 310 acts as a RootCA that issues an MO RootCA Certificate. The MO RootCA Certificate and MO SubCA Certificates issued by MO Subordinate Certification Authorities (SubCAs) may be used for issuing the Contract Certificate. In addition, according to the present disclosure, the MO RootCA Certificate and MO SubCA Certificates may be used to verify the Contract Certificate installed in the EV 100 in a non-roaming environment or a roaming environment. Alternatively, however, only the EV Certificate may be used and the Contract Certificate may not be used.

The certificate provisioning service (CPS) 320 provides a client such as the EV with a Contract Certificate chain and encryption keys used for transmitting or receiving the certificates during a process of installing or updating the Contract Certificate in the EV. The CPS 320 is equipped with a Leaf Provisioning Certificate and Provisioning SubCA Certificates such as a Prov SubCA 1 Certificate and Prov SubCA 2 Certificate. When the Contract Certificate is installed or updated in the EV 100, the CPS 130 provides the EV with a provisioning service of providing a public key of each MO, a Diffie-Hellman (DH) public key, and eMAID along with the contract certificate chain, so that the EV validate the Contract Certificate chain and verify the integrity and authenticity of the Contract Certificate using such data.

The contract certificate pool (CCP) 330 temporarily stores a response message for the installation or update during the process of installing or updating the Contract Certificate in the EV. Taking into account that a time limit set for the installation or update in the ISO 15118 standard is very short and strict, the response message is stored in the CCP 330 in advance and maintained until the installation or update is completed. Since there may be a plurality of EVs for which the installation or update of the Contract Certificate is performed, the response message is maintained in a form of a directory after an index is assigned to each message.

The Vehicle-to-grid (V2G) server 150, hereinbelow referred to as 'V2G') authenticates the identity of each participant in the VGI system and manages all settings and system configuration related to a forward power transfer from the grid to each EV 100 and reverse power transfer from each EV 100 to the grid. In addition, considering that the power demand and a power factor may fluctuate by time within the grid, the V2G 340 performs an operation for a demand response (DR), i.e., an operation for peak reduction and may perform a frequency regulation (FR) operation to prevent a serious distortion of the power factor. In a viewpoint of the DR and FR, the V2G 340 may adjust the instantaneous electrical energy supply from various power generation companies, renewable energy sources, and EVs 100 moment by moment and may monitor the power supply to each consumer. The V2G 340 acts as a highest RootCA in the public key infrastructure (PKI) for the EV charging infrastructure. Thus, the V2G 340 serves as a highest trust anchor, and all actors shown in FIG. 1 consider the V2G RootCA as a trustworthy actor.

The charge point operator (CPO) 350 is in charge of an operation of the charging station and manages electricity to provide a requested energy transfer service. The CPO 350 may be operated by a charging station manufacturer or an electricity provider, for example. Regarding the PKI, the CPO 350 may operate CPO SubCAs such as CPO SubCA 1 and CPO SubCA 2 required to issue a SECC Leaf Certificate for each charging station.

The charge service provider (CSP) 360 manages and authenticates credentials of the EV user and provides billing and other value-added services to customers. The CSP 360 may be considered as a special type of the MO 310 and may be implemented to be integrated with the MO 310. There may exist a plurality of CSPs 360. In such a case, each CSP 360 may be associated with one or more CPOs 350 so that the CSP 360 and the one or more CPOs 350 constitute a charging network. The EV 100 can receive the charging service by the plug-and-charge or park-and-charge (PnC) method in the CPO 350 associated with the CSP 360 that is associated again with the MO 310 having the contractual relationship with the EV 110. However, a roaming is required when the EV 100 is to be charged from another CPO 350 which is not associated with the CSP 360 that is associated again with the MO 100 having the contractual relationship with the EV 100. Each CSP 360 may exchange information with another CSP or CPO 350 belonging to another charging network and may also exchange information with the clearing house 370 to enable the roaming.

The clearing house (CH) 370 handles the cooperation issues between the MOs 300 and the CSPs 360. That is, the clearing house 370 may perform a role of an intermediate actor facilitating the authorization, billing, and settling procedure for the EV charging service roaming between two clearing parties. When the EV owner wishes to charge the EV at a charging station that does not belong to the charging network of the MO 310 having the contractual relationship with the EV, the CH 370 may be connected to the CPO 350 or the CSP 360 to facilitate the roaming. In a situation that the roaming is necessary, the CH 370 enables the CPO 350 or CSP 360 to execute a contract with the MO 310 and transfer authorization data and charging detail records (CDR) to the MO 310. The CH 370 may also be referred to as a 'contract clearing house (CCH)', 'mobility clearing house (MCH)', 'roaming platform', or 'e-mobility clearing house (E-MOCH)'.

Though the electric vehicle manufacturer (OEM) 300, the mobility operator (MO) 310, the certificate provisioning service (CPS) 320, the contract certificate pool (CCP) 330, the vehicle-to-grid (V2G) 340, the charge point operator (CPO) 350, the charging service provider (CSP) 360, and the contract clearing house (CH) 370 may seem to refer to persons or organizations, these terms used herein are named using shorthand language to increase readability of the disclosure provided herein and may be implemented in hardware, software, and/or a combination thereof. In an exemplary embodiment, each of these components may be a server device implemented by a combination of hardware and software and may allow an access of other devices through a network such as Internet. Since these components are functionally divided, two or more of them may be stored and executed in a single physical device or may be integrated into a single program. In particular, a single entity may perform the roles of both the CSO and the CSP, and another single entity may serve as both the CPS and the CCP.

Meanwhile, one or more of the components may be rearranged to result in a different system configuration and to have different names.

On the other hand, the EV charging service and the related infrastructure are in a field where various industrial fields such as automobiles, power grid, energy, transportation, communications, finance, and electronic products converges, and standardizations have been carried out in parallel in various viewpoints and by various subjects including multiple international standardization organizations and domestic standardization organizations in individual countries, and thus there exist many terms containing similar concepts. In particular, the charging station operator (CSO) and the charge point operator (CPO) may be referred to as a charging station operator (CSO). In addition, the charging service provider (CSP) has at least partially in common with the mobility operator (MO) in terms of their roles and functions and may be used interchangeably. Such circumstances is to be taken into account while interpreting the present specification including the claims.

In the EV charging infrastructure shown in FIG. 1, a public key infrastructure (PKI) is used as a basis for operating the PnC. The PKI provides a framework for verifying identities of a person and a device, activating confidential communications, and ensuring controlled access to resources. FIG. 2 shows an example of a PKI-based certificate hierarchy applicable to an exemplary embodiment of the present disclosure.

Referring to FIG. 2, the OEM 300 serves as a RootCA that issues the OEM RootCA Certificate, and also operates subordinate certification authorities, i.e. the OEM SubCA 1 and the OEM SubCA 2. The OEM 300 issues an OEM SubCA 1 Certificate by signing a hash of a public key of the OEM SubCA 1 with its own private key. The OEM SubCA 1 issues an OEM SubCA 2 Certificate by signing a hash of a public key of the OEM SubCA 2 with a private key of the OEM SubCA 1. When the EV is being manufactured, the OEM SubCA 2 issues the OEM Provisioning Certificate by signing a hash of a public key of the EV with a private key of the OEM SubCA 2, so that the OEM Provisioning Certificate is installed in the EV 100. The OEM Provisioning Certificate can be used to verify a signature in the certificate installation request message during a certificate installation process for the EV 100, and enables to uniquely identify the vehicle during a life of the EV 100.

In addition, the OEM may also operate and maintain subordinate certification authorities, i.e. EV SubCA 1 and EV SubCA 2. The OEM 300 issues an EV SubCA 1 Certificate by signing a hash of a public key of the EV SubCA 1 with its own private key. The EV SubCA 1 issues an EV SubCA 2 Certificate by signing a hash of a public key of the EV SubCA 2 with a private key of the EV SubCA 1. When the EV is being manufactured, the EV SubCA 2 issues the EV Certificate by signing a hash of a public key of the EV with a private key of the EV SubCA 2, so that the EV Certificate is installed in the EV 100.

The "EV Certificate" used herein may refer to a certificate issued to an electric vehicle regardless of a contract with the MO, in contrast to the Contract Certificate which is issued to the electric vehicle of which owner has executed a contract with the MO. The EV Certificate may be used for a mutual authentication during a TLS session establishment process according to the present disclosure. The EV Certificate may also be used for the SECC or the SAs to identify and authenticate the EV. A process of identifying, authenticating, and authorizing an electric vehicle using the EV Certificate by a PnC method is referred to as "EVPnC" in this specification. As will be described below, in a case where the mutual authentication according to the present disclosure is performed during the TLS session establishment process, the identification and authentication process in the application layer may be omitted in the EVPnC process according to the present disclosure.

Though an EV certificate chain including the EV SubCA certificates, i.e., the EV SubCA 1 Certificate and the EV SubCA 2 Certificate, are issued separately from an OEM provisioning certificate chain including the OEM SubCA 1 Certificate, the OEM SubCA 2 Certificate, and the OEM Provisioning Certificate, the OEM provisioning certificate chain may serve as the EV certificate chain alternatively. In such a case, the "EV certificate" in this specification may refer to the OEM Provisioned Certificate that functionally serves as the EV Certificate.

The MO 310 may also serve as a RootCA that issues the MO RootCA certificate. The MO 310 may issue an MO SubCA 1 Certificate by adding its signature to an ID, a public key, and a hash of the public key of the MO SubCA 1. The MO SubCA 1 may issue an MO SubCA 2 Certificate by adding its signature to an ID, a public key, and a hash of the public key of the MO SubCA 2. When the EV is delivered to the EV owner, the MO SubCA 2 may issue the Contract Certificate by adding its signature to an ID, a public key, and a hash of the public key of the EV based on a contract executed between the MO 310 and the EV owner, so that the Contract Certificate may be installed in the EV 100 through a charging station (CS) 200 that the EV first visits. The Contract Certificate may be linked to the EV owner's payment account via a unique identifier called an e-Mobility Account Identifier (eMAID).

As mentioned above, in an exemplary embodiment of the present disclosure, the EV Certificate may be used while the Contract Certificate is not be used. In such a case, the identification, the authentication, and the service authorization for the EV may be performed by the EVPnC using the EV Certificate. In particular, when the mutual authentication is performed during the TLS session establishment process, the identification and authentication process in the application layer may be omitted in the EVPnC process, and the service authorization may be performed by using the contract information under an involvement of the MO 310 or by using the payment account information of the EV owner maintained by the MO 310.

The OEM Provisioning Certificate, the EV Certificate, and the Contract Certificate may be issued based on the OEM RootCA Certificate and the MO RootCA Certificate and may be independent from the global RootCA certificate, i.e. the V2G RootCA Certificate. As indicated by dashed lines in FIG. 2, however, the OEM Provisioning Certificate, the EV Certificate, and the Contract Certificate may be issued based on the V2G RootCA certificate instead of the OEM RootCA Certificate and the MO RootCA Certificate.

The V2G 340 may enable to issue at least two certificate chains, i.e. a certificate chain for the CPO 350 and the CS 200 and another certificate chain for the provisioning service.

First, the V2G 340 may issue a CPO SubCA 1 Certificate by adding its signature to an ID, a public key, and a hash of the public key of the CPO SubCA 1. The CPO SubCA 1 (or MO SubCA 1) may issue a CPO SubCA 2 Certificate by adding its signature to an ID, a public key, and a hash of the public key of the CPO SubCA 2. The CPO SubCA 2 may issue an SECC Leaf Certificate by adding its signature to an ID, a public key, and a hash of the public key of the SECC, so that the SECC Leaf Certificate is installed in the CS 200.

The SECC Leaf Certificate may be used by the EV 10 during the establishment of the TLS communications between the EV 100 and the CS 200. This certificate is stored in the CS 200 as well as in a backend of the CSO 350.

The V2G 340 may issue a Provisioning SubCA 1 Certificate by adding its signature to an ID, a public key, and a hash of the public key of the Provisioning SubCA 1. The Provisioning SubCA 1 may issue a Provisioning SubCA 2 Certificate by adding its signature to an ID, a public key, and a hash of the public key of the Provisioning SubCA 2. The Provisioning SubCA 2 may issue a Leaf Provisioning Certificate by adding its signature to an ID, a public key, and a hash of the public key of CPS 320 and provide the Leaf Provisioning Certificate to the CPS 320 so as to be installed in the CPS 320.

Meanwhile, each of the RootCAs, i.e. the V2G RootCA, the MO RootCA, and the OEM RootCA, may issue and provide an Online Certificate Status Protocol (OCSP) certificate, so that clients may access an OCSP server according to an Online Certificate Status Protocol to query a certificate status regarding a revocation of the certificate indicating a validity of the certificate and receive a query result. Although it is shown in FIG. 2 as if the OCSP certificate is available only for the CPO SubCAs (i.e. CPO SubCA 1 and CPO SubCA 2) for simplicity, all the RootCAs may issue an OCSP certificate to allow the query of the validity of the certificates in the certificate chains associated with their RootCA certificates.

In exemplary embodiments of the present disclosure, the certificate is verified or validated by one of three generally available methods. First, the certificate recipient may decrypt the message signature in the certificate with the public key in the certificate to restore a hash, and compares the restored hash with a hash included in the certificate to validate the integrity of the certificate. Second, the certificate recipient may validate the integrity and reliability of each certificate in the certificate chain by comparing owner information of each certificate with issuer information of its SubCA certificate sequentially from the RootCA certificate to the leaf certificate in the certificate chain. Third, the certificate recipient may validate the certificate by checking whether the certificate has been revoked or not through a Certificate Revocation List (CRL) received from the RootCA or by querying the certificate status from the OCSP server associated with the RootCA.

Figure 3:
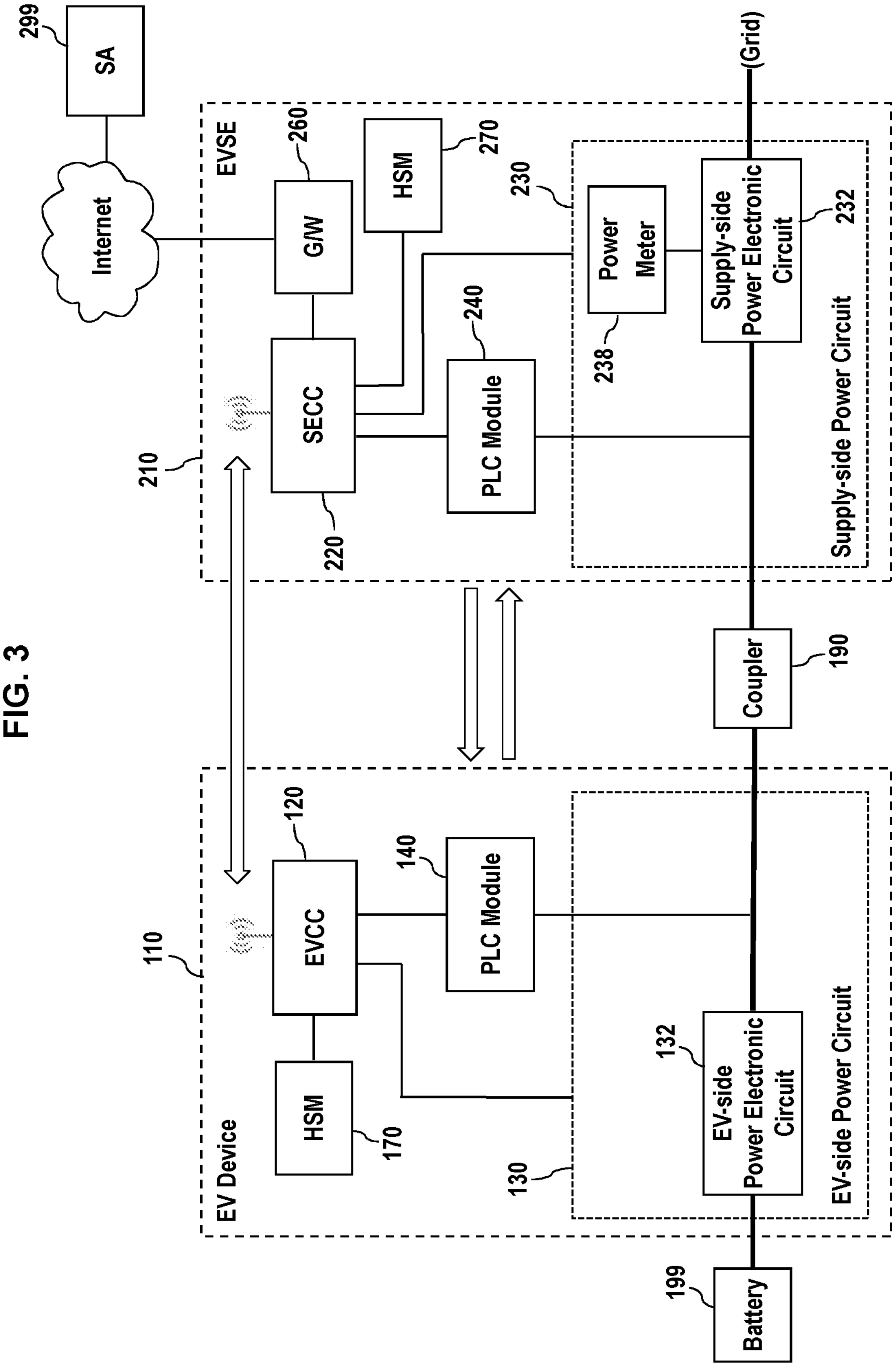
FIG. 3 is a block diagram of an embodiment of the EV and the charging station shown in FIG. 1.

FIG. 3 is a block diagram of an embodiment of the EV and the charging station shown in FIG. 1. The illustrated EV and EVSE are suitable for a conductive power transfer system. The charging station 200 includes at least one EV Supply Equipment (EVSE) 210, and the EV 100 includes an EV device 110 provided correspondingly to the EVSE 210 for power transfer. The EVSE 210 may supply DC or AC power to the EV 100 through a conductor so that a battery 199 mounted in the EV 100 may be charged. The EV device 110 and the EVSE 210 may be connected through a coupler 190.

The EVSE 210 may include a supply equipment communication controller (SECC) 220, a supply-side power circuit 230, a power line communications (PLC) module 240, a hardware security module (HSM) 270, and a gateway 280. Though the SECC 220 may be installed outside the EVSE 210 as well in the charging station and one SECC 220 may be configured to control a plurality of, for example, four EVSEs 210, it is shown in FIG. 3 that one EVSE 210 includes two SECCs 220 for the convenience of description.

The SECC 220, which is a high-level controller, may communicate with an EV communication controller (EVCC) 120 in the EV device 110 through power line communications (PLC) or a wireless LAN (WLAN). The SECC 220 and the EVCC 120 may communicate with each other in an application layer, i.e., in an OSI layer 3 and higher layers according to an ISO 15118-2 or an ISO 15118-20 standard, for example. A physical layer and a data link layer between the SECC 220 and the EVCC 120 may be configured to conform to the ISO 15118-8 standard, for example. In addition, the SECC 220 may control the supply-side power circuit 230. Further, the SECC 220 may perform an authentication of the EV user and a payment process for a charging fee through secondary actors (SAs) such as the MO 310 through the Internet.

The supply-side power circuit 230 may supply the power from the power grid to the EV 100 or supply the power discharged by the EV 100 to the power grid. The supply-side power circuit 230 may include a supply-side power electronic circuit 232, and an electric power meter 238. The supply-side power electronic circuit 232 may include one or more of a converter adjusting a level of a voltage and/or a current and a rectifier converting an AC current into a DC current. The electric power meter 238 measures an amount of energy supplied to the EV device 110 through the supply-side power electronic circuit 232 or an amount of energy supplied in a reverse direction from the EV device 110 to the supply-side power electronic circuit 232.

The PLC module 240 may modulate a signal transmitted to the EV device 110 through the power line communications and demodulate a signal received from the EV device 110 through the power line communications. Although not shown in FIG. 3, the EVSE 210 may further include a control pilot transceiver capable of transmitting a control signal to the EV device 110 through a cable connecting the EVSE 210 and the EV device 110 and receiving a control signal from the EV device 110.

The hardware security module (HSM) 270 may store various security information such as the SECC Certificate, a public key and a private key of the SECC 220, a secret key for a symmetric key encryption, and other credentials of the SECC 220, and an OEM RootCA Certificate, and/or a V2G RootCA Certificate for verifying the EV Certificate chain received from the EVCC 120.

The gateway 280 may provide a connection of the SECC 220 to a secondary actor (SA) 299 over the Internet so as to enable the authentication of the user and the payment processing through communications between the SECC 220 and the SA 299.

The EV device 110 may include an EVCC 120, an EV-side power circuit 130, a PLC module 140, and a hardware security module (HSM) 170.

The EVCC 120, which is a high-level controller, may communicate with the SECC 220 in the EVSE 210 through the power line communications (PLC) or the wireless LAN (WLAN) and control the EV-side power circuit 130. The EV-side power circuit 130 may charge the battery 199 used for a propulsion of the EV 100 by the power received from the EVSE 210, or may supply the energy stored in the battery 199 to the power grid through the EVSE 210. The EV-side power electronic circuit 132 in the EV-side power circuit 130 may include one or more of a converter adjusting a level of a voltage and/or a current and a rectifier converting the AC current into the DC current. The PLC module 140 may modulate a signal transmitted to the EVSE 210 through the power line communications and demodulate a signal received from the EVSE 210 through the power line communications.

The hardware security module (HSM) 170 may store various security information such as the Contract Certificate, a public key and a private key of the EVCC 120, the secret key for the symmetric key encryption, and other credentials of the EVCC 120, and the V2G RootCA Certificate for verifying the SECC Certificate chain received from the SECC 220.

Figure 4:
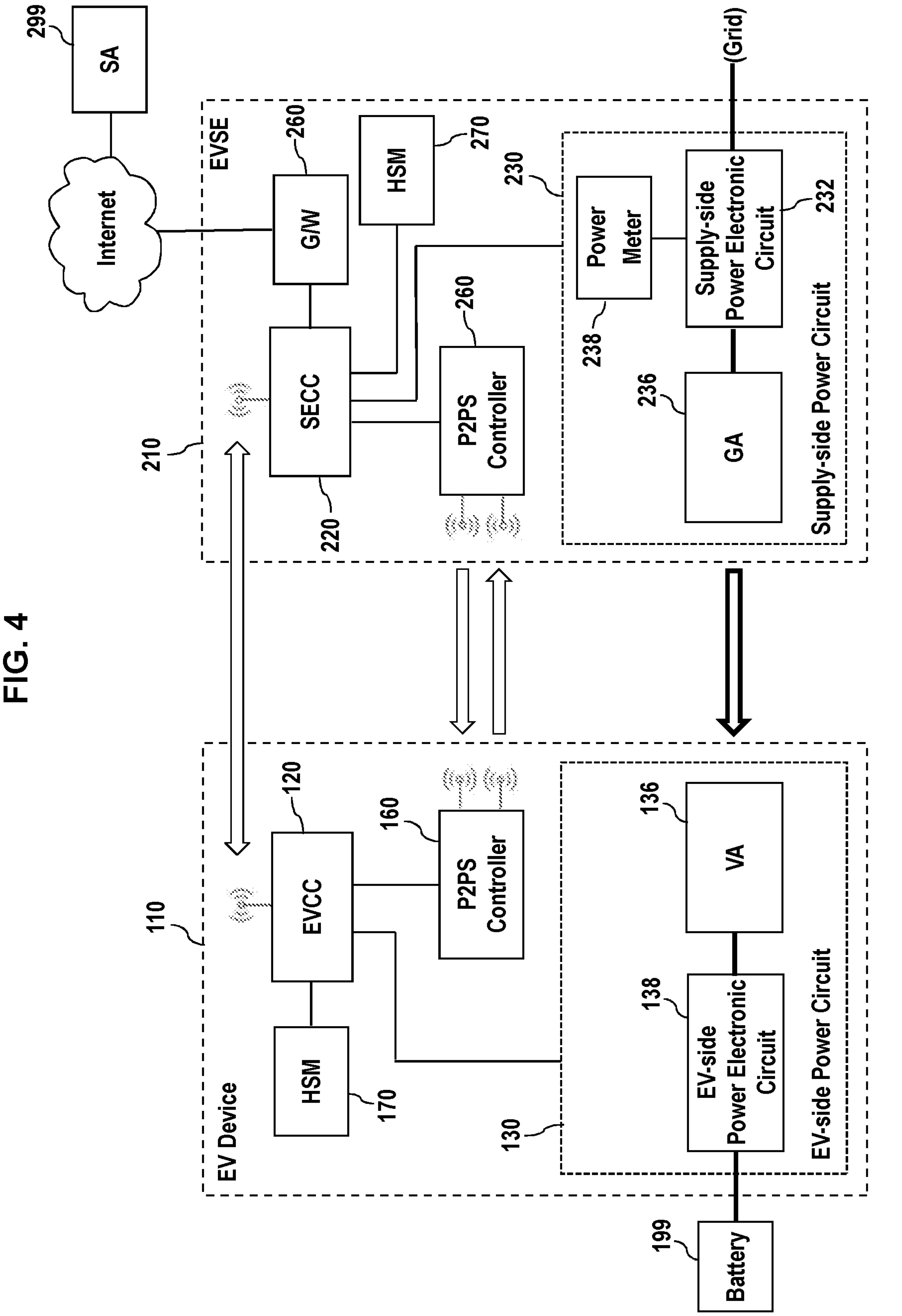
FIG. 4 is a block diagram of another embodiment of the EV and the charging station shown in FIG. 1.

FIG. 4 is a block diagram of another embodiment of the EV and the charging station shown in FIG. 1. The illustrated EV and EVSE are suitable for a wireless power transfer system. The charging station 200 includes at least one EV Supply Equipment (EVSE) 210, and the EV 100 includes an EV device 110 provided correspondingly to the EVSE 210 for power transfer. The EVSE 210 may supply energy to the EV 100 by a wireless power transfer so that the battery 199 mounted in the EV 100 may be charged.

The EVSE 210 may include a SECC 220, a supply-side power circuit 230, a point-to-point signal (P2PS) controller 260, a hardware security module 270, and a gateway 280. Though the SECC 220 may be installed outside the EVSE 210 as well in the charging station and one SECC 220 may be configured to control a plurality of, for example, four EVSEs 210, it is shown in FIG. 2 that one EVSE 210 includes two SECCs 220 for the convenience of description.

The SECC 220, which is a high-level controller, may communicate with the EVCC 120 in the EV device 110 through the wireless LAN (WLAN). The SECC 220 and the EVCC 120 may communicate with each other in an application layer, i.e., in an OSI layer 3 and higher layers according to the ISO 15118-2 or ISO 15118-20 standard, for example. A physical layer and a data link layer of the WLAN link may be configured to conform to the ISO 15118-8 standard, for example. In addition, the SECC 220 may control the supply-side power circuit 230 and the P2PS controller 260. Further, the SECC 220 may perform the authentication of the EV user and the payment process for the charging fee through the secondary actors (SAs) such as the MO 310 through the Internet.

The supply-side power circuit 230 may supply the power from the power grid to the EV 100 or supply the power discharged by the EV 100 to the power grid. During a forward power transfer process in which the power is supplied from the EVSE 210 to the EV 100, the supply-side power circuit 230 may receive the electric power supplied from the power grid, forms a magnetic flux, and transfer the energy to the EV device 110 by a magnetic resonance. The supply-side power circuit 230 may include a supply-side power electronic circuit 232 adjusting a frequency and levels of the voltage and/or the current, a ground assembly (GA) device 236 generating a high-frequency magnetic flux, and an electric power meter 238 measuring an amount of energy transferred between the EVSE 210 and the EV device 110.

The P2PS controller 260 may perform P2PS communications with a corresponding component of the EV device 110 under a control of the SECC 220. In this specification including the appended claims, the P2PS communication refers to a communication of transmitting and receiving a signal for the charging using a low frequency (LF) magnetic field signal and/or a low power excitation (LPE) signal.

The EV device 110 may include an EVCC 120, an EV-side power circuit 130, and a hardware security module 170.

The EVCC 120, which is a high-level controller, may communicate with the SECC 220 in the EVSE 210 through the wireless LAN. The EVCC 120 may control the EV-side power circuit 130 and the P2PS controller 160. The P2PS controller 160 may perform P2PS communications with the P2PS controller 260 of the EVSE 210 using the low frequency (LF) magnetic field signal and/or the low power excitation (LPE) signal under the control of the EVCC 120.

The EV-side power circuit 130 may transform magnetic energy received from the EVSE 210 into electrical energy to charge the battery 199, or may transform the energy stored in the battery 199 into the electrical energy to transfer the energy to the EVSE 210 in a form of the magnetic energy. During the forward power transfer process in which the power is supplied from the EVSE 210 to the EV 100, the EV-side power circuit 130 may receive the magnetic energy from the GA 236 of the EVSE 210, convert the received magnetic energy into an induced current, and rectify the induced current into a direct current to charge the battery 199. The EV-side power circuit 130 may include a vehicle assembly (VA) device 136 receiving the high-energy level magnetic energy supplied in a magnetic resonance state from the GA device 236 by capturing a magnetic flux fluctuation induced by the GA device 236 and transforming the magnetic energy into the current, and an EV-side power electronic circuit 138 rectifying the current.

The hardware security module (HSM) 170 may store various security information such as the Contract Certificate, an EV Certificate, the public key and the private key of the EVCC 120, the secret key for the symmetric key encryption, and other credentials of the EVCC 120, and the V2G RootCA Certificate for verifying the SECC Certificate chain received from the SECC 220.

Figure 5:
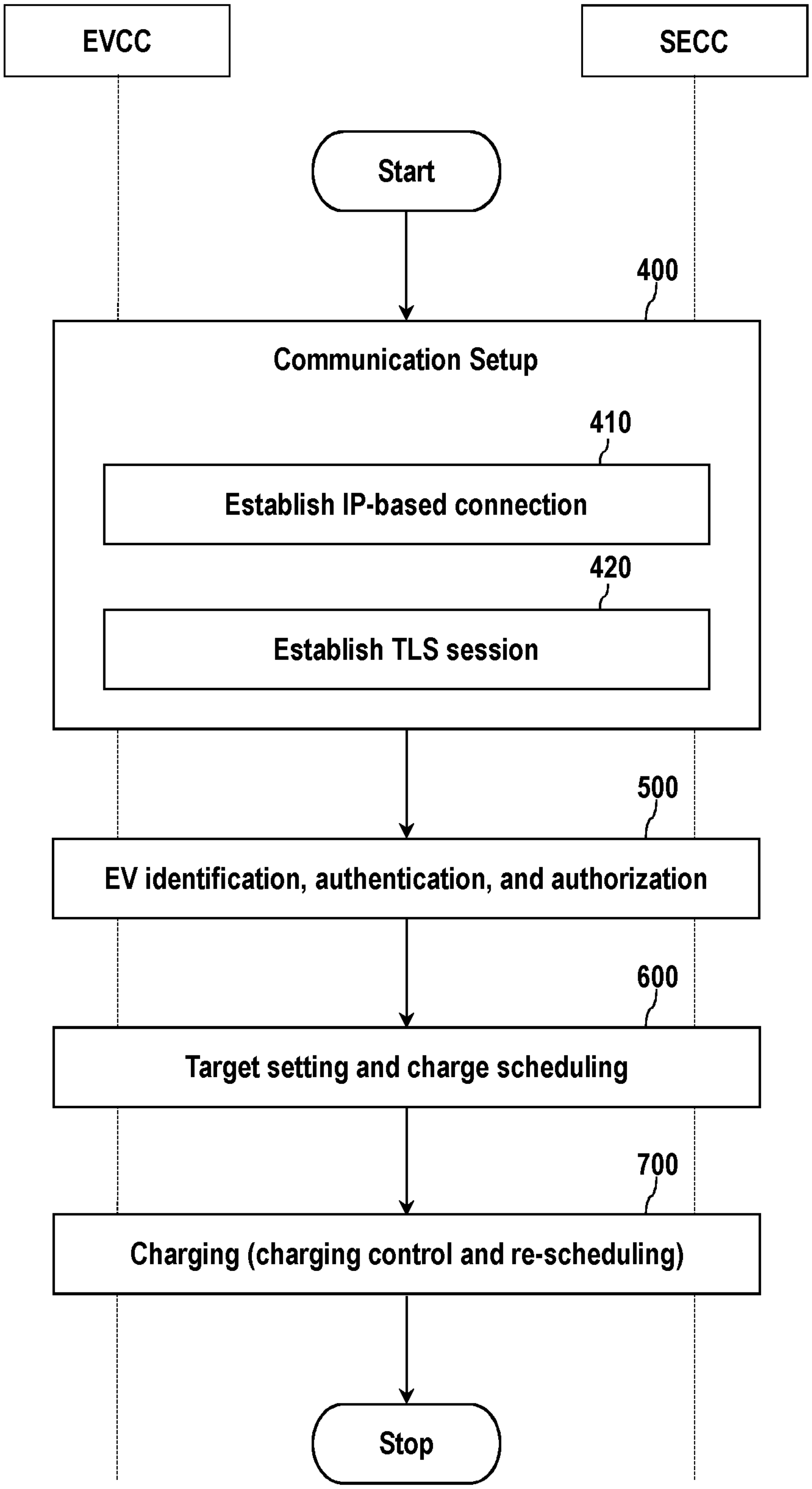
FIG. 5 is a flowchart showing an exemplary embodiment of a communication process between an EV communication controller (EVCC) and a supply equipment communication controller (SECC) for a plug-and-charge (PnC) charging.

FIG. 5 is a flowchart showing an exemplary embodiment of a communication process between the EVCC 120 and the SECC 220 for the PnC charging. The PnC charging process shown in FIG. 5 is based on the ISO 15118-2 and the ISO 15118-20 standards.

First, a communication channel is established between the EVCC 120 and the SECC 220 (operation 400). In the communication setup operation, an IP-based connection is established first between the EVCC 120 and the SECC 220 (operation 410), and then a TLS session, i.e., a secure connection is established between the EVCC 120 and the SECC 220 (operation 420).

In an initial stage of the TLS session establishment, the EVCC 120 and the SECC 220 provide their certificate chains to the other party and authenticate the other party based on the certificate chain received from the other party. That is, the EVCC 120 receives the SECC certificate chain including the SECC Leaf Certificate and the CPO SubCA certificates, i.e. the CPO SubCA 1 Certificate and the CPO SubCA 2 Certificate from the SECC 220, and verifies the SECC Leaf Certificate using the CPO subCA Certificates and the V2G RootCA Certificate stored in the HSM 170.

Similarly, the SECC 220 receives the EV certificate chain including the EV Certificate and EV SubCA certificates, i.e., the EV SubCA 1 Certificate and the EV SubCA 2 Certificate, from the EVCC 120. The SECC 220 reads, from the HSM 270, a trust anchor for the EV subCA certificates, i.e. the V2G RootCA Certificate or the OEM RootCA Certificate and verifies the EV Certificate using the EV subCA Certificates and the trust anchor read from the HSM 270.

Such a mutual authentication between the EVCC 120 and the SECC 220 may enhance an ability of the system to defend against external attacks during the secure channel establishment process and improve the security.

When a TLS session is established after the mutual authentication, the EVCC 120 and the SECC 220 may generate a symmetric key to use the symmetric key in the encryption of data during data exchanges. That is, the EVCC 120 and the SECC 220 exchange messages and data encrypted by the symmetric key in operations 500-700.

In operation 500, an identification, authentication, and authorization for the EVCC 100 are performed. Specifically, the SECC 200 receives the contract certificate chain including the Contract Certificate and MO subCA certificates, i.e., the MO SubCA 1 Certificate and the MO SubCA 2 Certificate, from the EVCC 100. The SECC 200 reads the trust anchor for the MO subCA certificates, that is, the V2G RootCA Certificate or the OEM RootCA Certificate. The SECC 200 verifies the EV Certificate using the EV subCA Certificates and the trust anchor read from the HSM 270. Subsequently, the SECC 200 provides the eMAID in the certificate owner identification information in the Contract Certificate to the CSP 360 and requests the authorization of a service for the EV. The CSP 360 checks the eMAID account status in response to the request of the SECC 200, determines whether the contract for the EV is valid enough to provide the charging service, and provides an authorization result based on the determination to the SECC 200.

If the authentication and the authorization are completed normally in the operation 500, a target charging level may be determined through a communication between the EVCC 120 and the SECC 220 and a charging schedule including a charging profile may be established (operation 600). The SECC 220 controls the charging of the EV so that the charging is performed until a charging termination condition is satisfied (operation 700). The charging schedule may be adjusted during the charging process. Examples of charging termination conditions may include an accomplishment of the target charging level, a request of the EVCC 100, a decision of the SECC 220 due to insufficient power, and a request of a secondary actor. An adjustment of the charging schedule may be made according to a request of the EV user in the EV or via a secondary actor or an adjustment request entry of the EV user at the EVSE 210, for example, depending on a charging mode. The adjustment of the charging schedule may be performed by a decision of the SECC 220 also based on information or a request from a secondary actor. When the power transfer is completed, the EVCC 120 may request a receipt from the SECC 220, and the SECC 220 may provide a receipt indicating the charge amount in response to the request.

Figure 6:
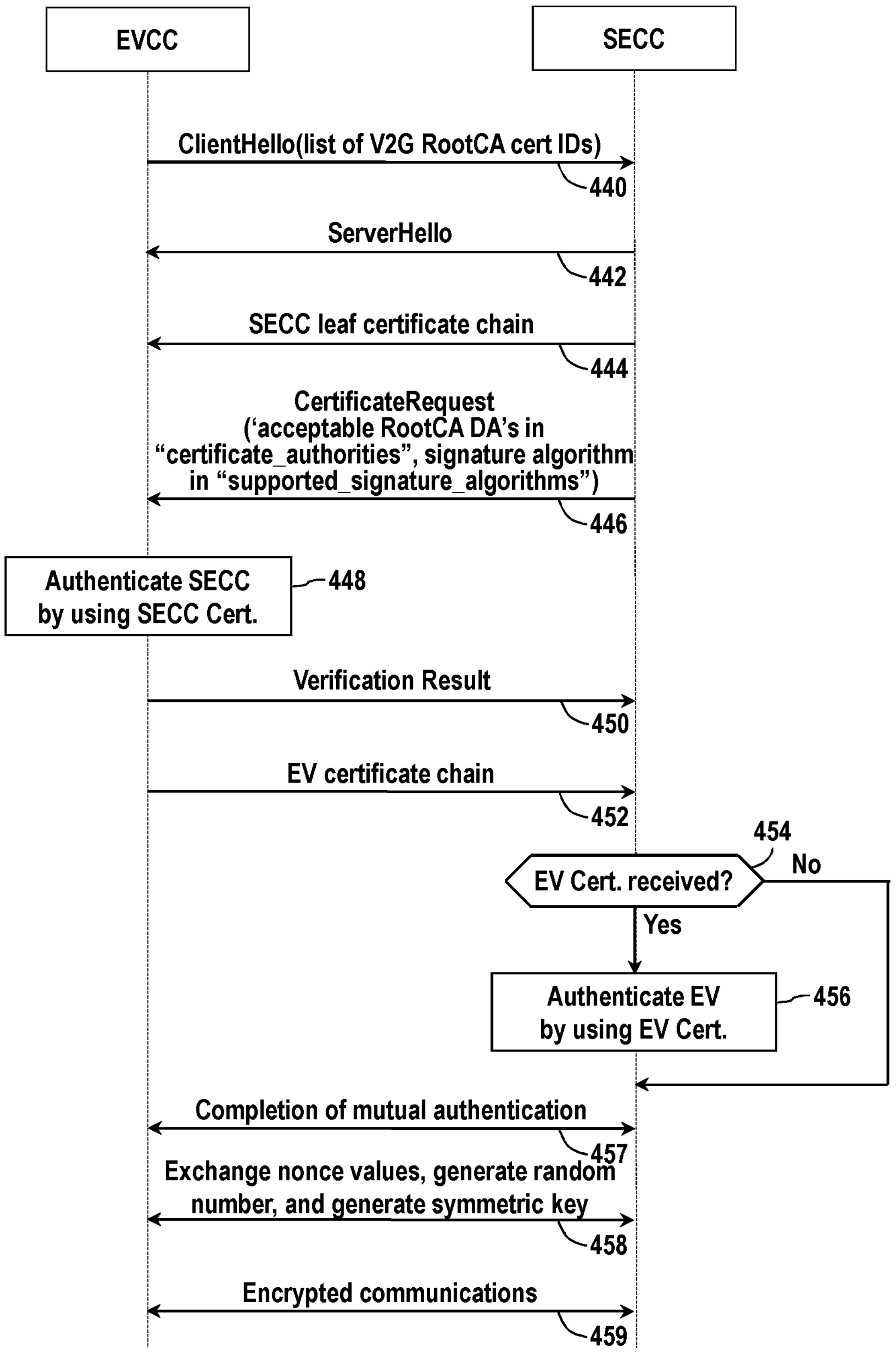
FIG. 6 is a sequence diagram showing in detail a transport layer security (TLS) session establishment process of an operation of establishing a secure connection in FIG. 6 according to a first embodiment of the present disclosure.

FIG. 6 is a sequence diagram showing in detail the TLS session establishment process of the operation 420 in FIG. 5 according to a first embodiment of the present disclosure. The TLS session establishment process shown in FIG. 6 is a modification of the process specified in the ISO 15118-2 (2014) standard.

According to the ISO 15118-2 standard, a unilateral authentication is used in the TLS session establishment process. That is, the EVCC 120 authenticates the SECC 220, but the SECC 220 does not authenticate the EVCC 120. According to this standard, there is a case that a certificate installed in the EV 100 is used to verify the EV. However, the certificate used for the authentication of the EV is not the EV Certificate but the Contract Certificate. Furthermore, the authentication of the EV is not performed in the TLS session establishment process but for the authorization and payment purposes. In other words, the EV 100 sends the Contract Certificate through a PaymentDetailsReq message and sends the signature through an AuthorizationReq message in the identification, authentication, and authorization process of the operation 500 rather than in the TLS session establishment process of the operation 420 in FIG. 5, and the CPO 350 verifies the identity of the EV 100. In contrast, according to exemplary embodiments of the present disclosure, the mutual authentication procedure is performed such that the SECC 220 authenticates the certificate provided by the EVCC 120 and the EVCC 120 authenticates the certificate provided by the SECC 220. During the process of establishing the TLS session in which the mutual authentication is performed, the SECC 220 works like a TLS server component.

Referring to FIG. 6, the EVCC 120 may provide a list of V2G RootCA certificate IDs maintained by the EVCC 120 to the SECC 220 when transmitting a ClientHello message (operation 440). Subsequently, the SECC 220 sends a ServerHello message in response to the ClientHello message and provides the SECC leaf certificate chain to the EVCC 12 (operations 442 and 444). It is desirable that the trust anchor for the CPO SubCA certificates, i.e., the CPO SubCA 1 Certificate and the CPO SubCA 2 Certificate, in the SECC leaf certificate chain is included in the V2G RootCA certificates provided by the EVCC 120.

In addition, the SECC 220 may request a certificate chain to the EVCC 120 by sending a CertificateRequest message (operation 446). At this time, the SECC 220 may specify, in a "certificate_authorities" extension of the CertificateRequest message, a list of distinguished names of V2G Root Certificates and/or OEM Root Certificates that are maintained by the SECC 220 and are available for the mutual authentication, and may further specify, in an "supported_signature_algorithms" extension, a 'SHA256' hash function and an ECDSA signature algorithm, so that the EVCC 120 may provide a certificate chain corresponding to the specifications in the extensions.

In operation 448, the EVCC 120 authenticates the SECC 220 by using the SECC Leaf Certificate. That is, the EVCC 120 may authenticate the integrity of the SECC Leaf Certificate by verifying the SECC Leaf Certificate with a public key of the CPO SubCA 2 included in the CPO SubCA 2 Certificate, verifying the CPO SubCA 2 Certificate with a public key of the CPO SubCA 1 included in the CPO SubCA 1 Certificate, and verifying the CPO SubCA 1 Certificate with a public key of the V2G 340, for example, included in the V2G RootCA Certificate which may be a trust anchor for the SECC leaf certificate chain. After verifying the integrity of the SECC Leaf Certificate, the EVCC 120 may send a verification result to the SECC 220 (operation 450).

In response to the request for a certificate chain from the SECC 220, the EVCC 120 may send an EV certificate chain to the SECC 220 (operation 452). The EV certificate chain may include EV SubCA certificates, i.e., the EV SubCA 1 Certificate and the EV SubCA 2 Certificate. Upon receiving the EV certificate chain from the EVCC 120 in operation 454, the SECC 220 may authenticate the EVCC 120 by using the EV Certificate (operation 456). That is, the SECC 220 may authenticate the integrity of the EV Certificate by verifying the EV Certificate with a public key of the EV SubCA 2 included in the EV SubCA 2 Certificate, verifying the EV SubCA 2 Certificate with a public key of the EV SubCA 1 included in the EV SubCA 1 Certificate, and verifying the EV SubCA 1 Certificate with a public key of the OEM 300, for example, included in the OEM RootCA Certificate which may be a trust anchor for the EV certificate chain. Thus, the mutual authentication may be completed (operation 457). On the other hand, if no response is received from the EVCC 120 in the operation 454 or the EV certificate chain is not normally received because the certificate list received from the EVCC 120 is empty, the SECC 220 may perform an one-way (i.e., unidirectional) TLS instead of a two-way TLS.

Subsequently, the EVCC 120 may generate a nonce of the EVCC 120 to transmit to the SECC 220, and the SECC 220 may generate a nonce of the SECC 220 to transmit to the EVCC 120. Next, the EVCC 120 may generate a kind of random number called a pre-master secret (PMS), encrypts the PMS value using the public key of the SECC 220 obtained from the SECC Leaf Certificate, and sends an encrypted PMS value to the SECC 220. Through the exchange of the nonce values and the PMS value, the EVCC 120 and the SECC 220 generate a symmetric key (operation 458). Afterwards, the EVCC 120 and the SECC 220 perform encrypted communications by encrypting data using the symmetric key (operation 459). Since the encryption and decryption of data using asymmetric keys spend more resources than the operations using the symmetric key, the EVCC 120 and the SECC 220 encrypt data using the asymmetric keys when performing the initial authentication process but encrypt data using the symmetric key once a secure connection is established.

Meanwhile, in the EV identification, authentication, and authorization operations (operation 500) shown in FIG. 5, the EVCC 120 may provide the SECC 220 with payment options available to the EV user through a PaymentServiceSelectionReq( ) message, and the payment options may include 'EVPnC', i.e., the PnC using the EV Certificate. When the payment option chosen by the EV user is the EVPnC, the EVCC 120 may skip the PaymentDetailsReq message, but sends the AuthorizationReq message with empty contents. The SECC 220 responds to the AuthorizationReq message by sending an AuthorizationRes message with a parameter setting of ResponseCode='OK' in a case where (1) the EV Certificate provided in the TLS session has not been revoked, (2) a valid contract associated with the EV is found, (3) a contract is approved for a requested service, or (4) the verification is executed in the backend from the point of connection to the present time. As a result, when the TLS session is established by the mutual authentication according to the present disclosure, the SECC 220 may provide the EVPnC as one of EV identification and authentication methods. At this time, the authentication in the application layer according to the ISO 15118-2 standard may be unnecessary. In addition, a service requested by the EVCC 120 may be authorized by using result of the mutual authentication. At this time, any interaction with the EVCC 120 may be unnecessary, and only confirmation from the MO or CSP may be required in the backend. On the other hand, in a case where the TLS session is established by the one-way authentication rather than mutual authentication, the SECC 220 does not provide the EVPnC as one of the EV identification and authentication methods, and thus the EV identification, authentication, and authorization may be performed by the normal PnC procedure.

If the EV wants to resume a paused charging session, the EVCC 120 may send the same EV Certificate, during a TLS establishment, as that used in the paused session. After receiving a SessionSetupReq message from the EVCC 220, the SECC 220 may check if a pair of a session ID and the EV Certificate matches the one used in the paused session or not to resume the paused session. In this case, the rest of the communication process may be the same as that for establishing a new session described above. Meanwhile, the execution order of the operations 442-452 in FIG. 6 may be modified depending on the embodiments.

Though the ISO 15118-2 standard requires TLS only for the PnC, it is expected that the upcoming ISO 15118-20 standard may mandate the TLS for all use cases according to the discussions so far. Further, it is deemed to be possible that the ISO 15118-20 standard to be established in the future specifies a support for the mutual authentication in the TLS in consideration of security issues. According to the present disclosure, the EV Certificate belonging to the OEM PKI series may be installed in the EV 100 and used for the mutual authentication. To this end, the EV certificate chain needs to be installed in the EV 100 in advance, and a trust anchor for the EV certificate chain needs to be installed in the charging station 200. Meanwhile, the OEM Provisioning Certificate may be used as the EV Certificate to achieve the purpose of the mutual authentication as mentioned above.

Figure 7:
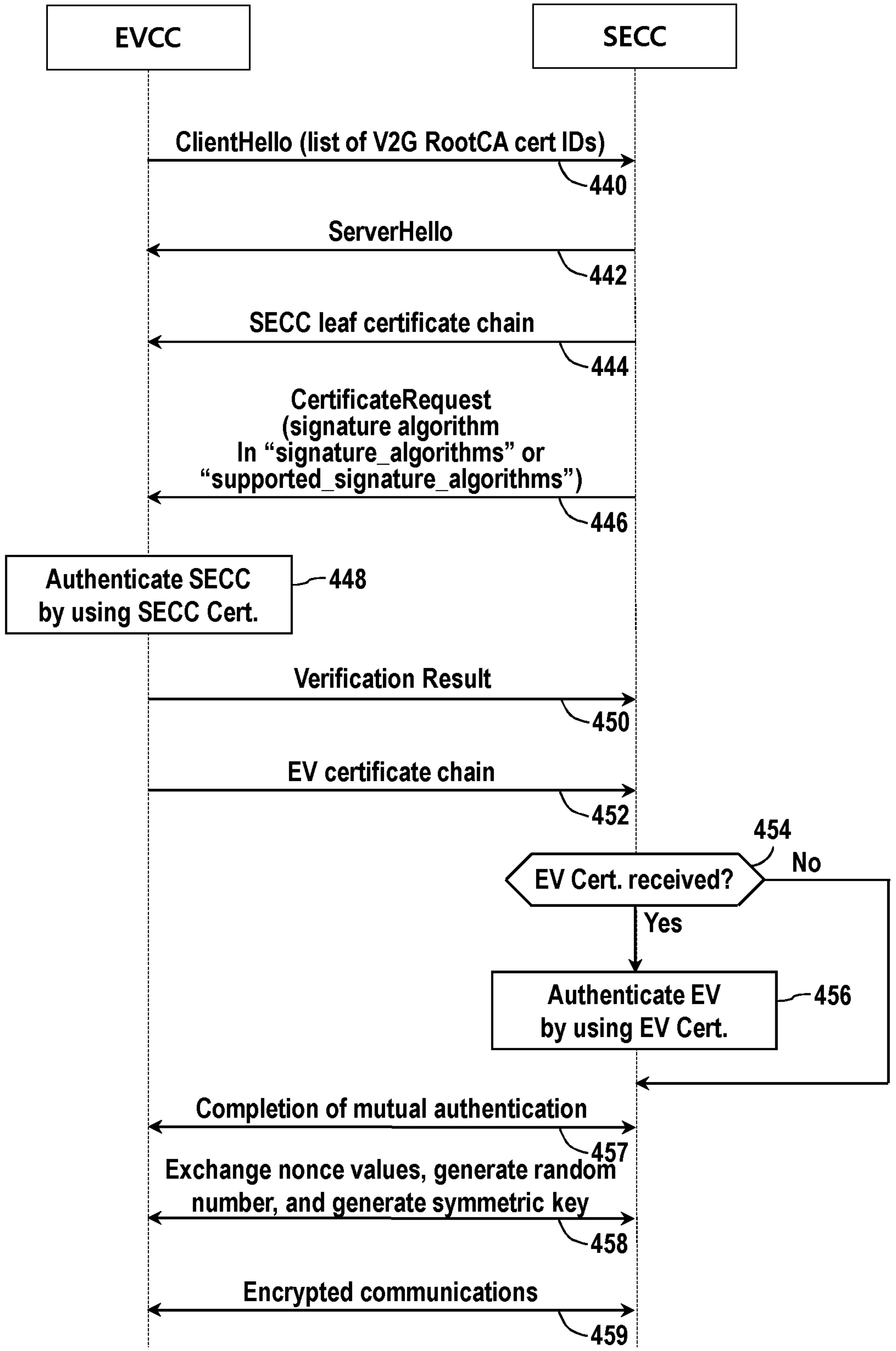
FIG. 7 is a sequence diagram showing in detail the TLS session establishment process of an operation of establishing a secure connection in FIG. 6 according to a second embodiment of the present disclosure.

In a case where TLS 1.2 is used for establishing a secure channel in the ISO 15118-20 standard, the TLS session establishment process shown in FIG. 6 may be equally applied. On the other hand, when TLS 1.3 is used for establishing the secure channel in the ISO 15118-20 standard, a TLS session establishment process may be similar to that shown in FIG. 6 as a whole except the extensions or parameters used in the CertificateRequest message in the operation 446 that is sent to the EVCC 120 by the SECC 220 when the ServerHello message is sent to the EVCC 120. That is, the SECC 220 may send the EVCC 120 the CertificateRequest message indicating the signature algorithm in a "signature_algorithms" or "signature_algorithms_cert" extension and indicating a list of distinguished names of the V2G RootCAs and/or OEM RootCAs in a "certificate_authorities" extension. FIG. 7 shows a TLS session establishment process when the TLS 1.3 is used. The other operations shown in FIG. 7 are similar to those shown in FIG. 6, and thus the descriptions thereof are omitted.

Figure 8:
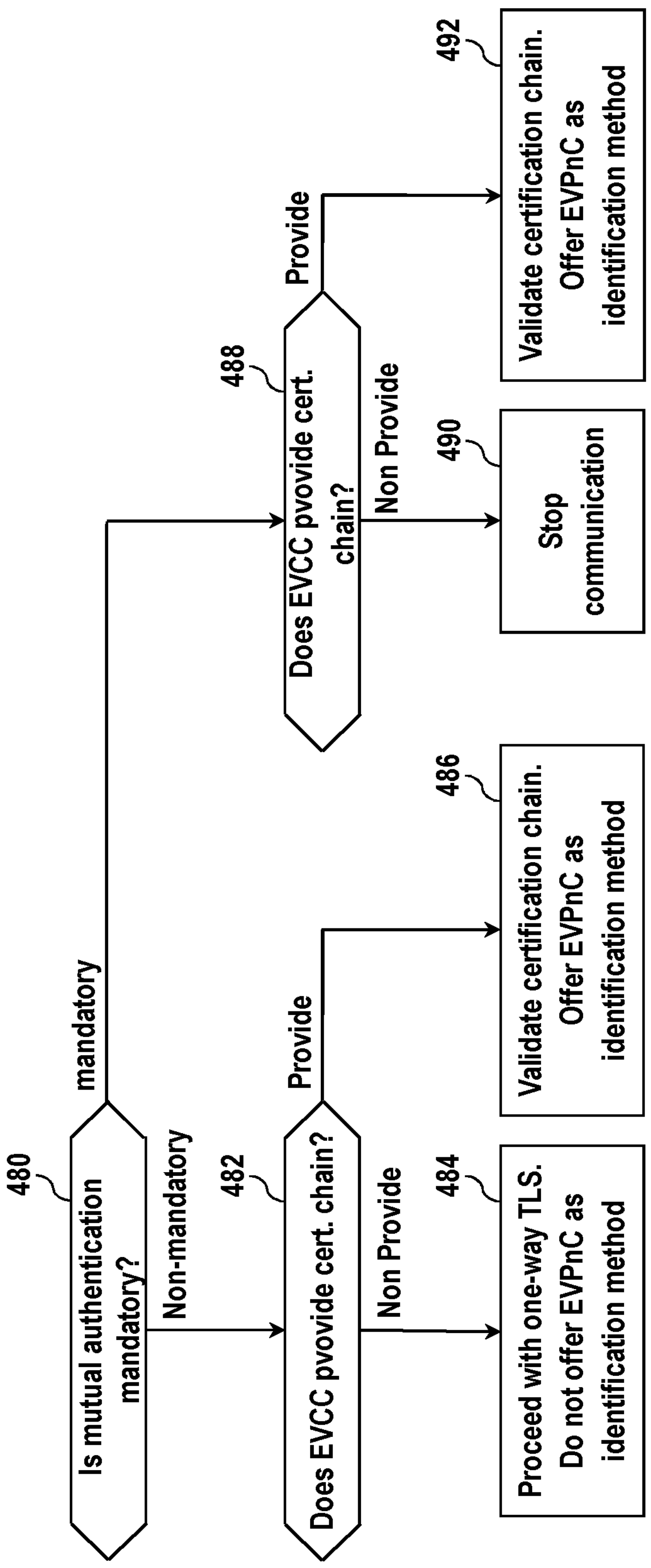
FIG. 8 is a flowchart showing differences in mutual authentication and TLS channel establishment procedures according to a TLS version used for establishing a secure channel or whether a two-way TLS is mandatory or not.

Meanwhile, the mutual authentication and TLS channel establishment procedures may be slightly vary depending on the TLS version used for establishing the secure channel or whether the two-way TLS is mandatory in the ISO 15118-20 standard or a future standard corresponding thereto. FIG. 8 is a flowchart showing differences in mutual authentication and TLS channel establishment procedures according to the TLS version used for establishing the secure channel or whether the two-way TLS is mandatory.

IF the two-way TLS is not mandatory and the EVCC 120 sends an empty certificate list, that is, the EVCC 120 does not provide the SECC 120 with the certificate chain (operations 480 and 482), the SECC 220 may proceed with the one-way TLS but do not offer the EVPnC as an identification method (operation 484). If mutual TLS is not mandatory and the EVCC 120 provides the SECC 120 with the EV certificate chain (operation 480 and 484), the SECC 220 may validate the certificate chain and may offer the EVPnC as an identification method (operation 486).

Meanwhile, if the two-way TLS is mandatory and the EVCC 120 sends an empty certificate list (operations 480 and 488), the SECC 220 may stop the communication (operation 490). If the two-way TLS is mandatory and the EVCC 120 provides the SECC 120 with the EV certificate chain (steps 480 and 488), the SECC 220 may validate the certificate chain and provide the EVPnC as an identification method.

If the mutual authentication is completed and the EVCC 120 chooses EVPnC as the payment option, the EVCC 120 may skip the certificate authentication procedure, and the SECC 220 may skip the EV identification and authentication process in the application layer and utilize the result of the mutual authentication. If EVCC 120 wants to resume a paused session, the SECC 220 may apply the same mechanism as described for the ISO 15118-2 standard.

Figure 9:
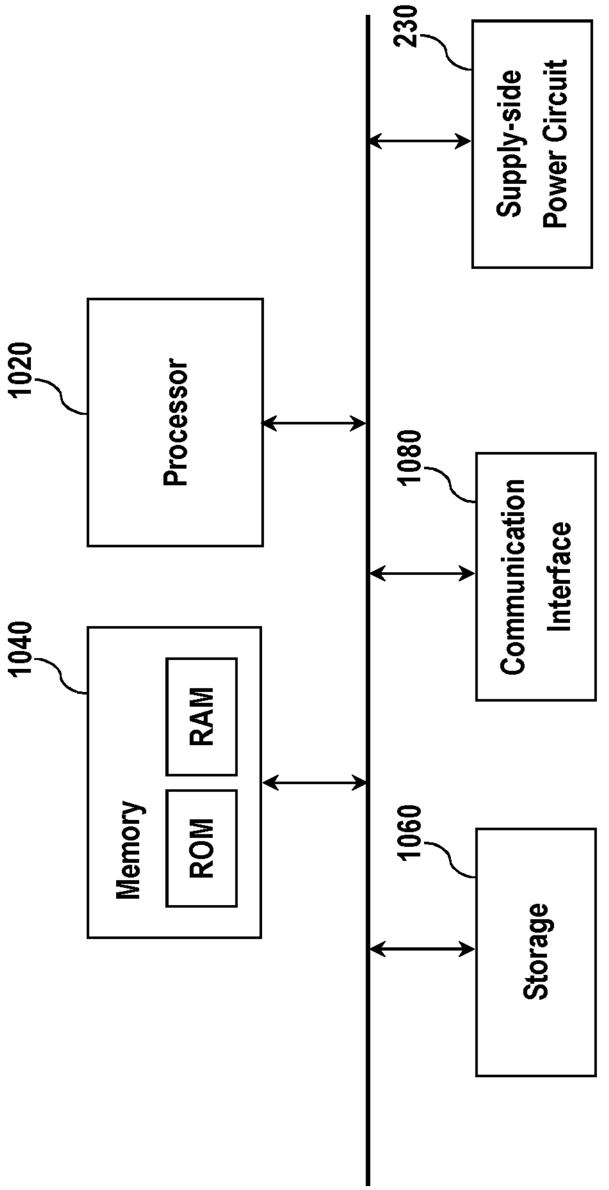
FIG. 9 is a block diagram illustrating a physical configuration of the charging station according to an exemplary embodiment of the present disclosure.

FIG. 9 is a block diagram illustrating a physical configuration of the charging station 200 according to an exemplary embodiment of the present disclosure. The charging station 200 may include at least one processor 1020, a memory 1040, a storage 1060, a communication interface 1080, and the supply-side power circuit 230. At least some components of the charging station 200 including the processor 1020 and the memory 1040 may be connected by a bus to exchange data. The charging station 200 may be implemented based on the EVSE 210 shown in FIG. 2 or FIG. 3. The processor 1020, the memory 1040, and the program instructions executed by the processor 1020 may configure the SECC 220 of the EVSE 210.

The processor 1020 may execute program instructions stored in the memory 1040 and/or the storage 1060. The processor 1020 may be at least one central processing unit (CPU), a graphics processing unit (GPU), or any other kind of dedicated processor suitable for performing the method according to the present disclosure.

The memory 1040 may include, for example, a volatile memory such as a read only memory (ROM) and a non-volatile memory such as a random access memory (RAM). The memory 1040 may load the program instructions stored in the storage 1060 so that the processor 1020 execute the program instructions.

The storage 1060 may include an intangible recording medium suitable for storing the program instructions and data files. Any device capable of storing data that may be readable by a computer system may be used for the storage. Examples of the storage medium may include magnetic media such as a hard disk, a floppy disk, and a magnetic tape, optical media such as a compact disk read only memory (CD-ROM) and a digital video disk (DVD), magneto-optical medium such as a floptical disk, and semiconductor memories such as ROM, RAM, a flash memory, and a solid-state drive (SSD).

The program instructions, when executed by the processor 1020, may cause the processor 1020 to: provide the EV with a supply equipment communication controller (SECC) certificate chain including a SECC Certificate and at least one charging device series SubCA Certificate used to issue the SECC Certificate; receive, from the EV, a verification result for the SECC Certificate and an EV certificate chain including an EV Certificate of the EV and at least one EV series SubCA Certificate used to issue the EV Certificate, and authenticate the EV by verifying the EV Certificate using the at least one EV series SubCA Certificate and a first RootCA Certificate stored in a storage of the CS device; generate a symmetric key through a handshake with the EV; and transmit and receive messages encrypted by the symmetric key to and from the EV.

The communication interface 1080 includes the WLAN interface, the PLC module 240, the P2PS controller 260, and the G/W 280 shown in FIG. 3 or 4, and enables the charging station 200 to communicate with an external device. The supply-side power circuit 230 may supply power from the power grid to the EV 100 or supply power discharged by the EV 100 to the power grid under a control of program instructions executed by the processor 1020.

As mentioned above, the apparatus and method according to exemplary embodiments of the present disclosure can be implemented by computer-readable program codes or instructions stored on a computer-readable intangible recording medium. The computer-readable recording medium includes all types of recording device storing data which can be read by a computer system. The computer-readable recording medium may be distributed over computer systems connected through a network so that the computer-readable program or codes may be stored and executed in a distributed manner.

The computer-readable recording medium may include a hardware device specially configured to store and execute program instructions, such as a ROM, RAM, and flash memory. The program instructions may include not only machine language codes generated by a compiler, but also high-level language codes executable by a computer using an interpreter or the like.

Some aspects of the present disclosure described above in the context of the apparatus may indicate corresponding descriptions of the method according to the present disclosure, and the blocks or devices may correspond to operations of the method or features of the operations. Similarly, some aspects described in the context of the method may be expressed by features of blocks, items, or devices corresponding thereto. Some or all of the operations of the method may be performed by use of a hardware device such as a microprocessor, a programmable computer, or electronic circuits, for example. In some exemplary embodiments, one or more of the most important operations of the method may be performed by such a device.

In some exemplary embodiments, a programmable logic device such as a field-programmable gate array may be used to perform some or all of the functions of the methods described herein. The field-programmable gate array may be operated along with a microprocessor to perform one of the methods described herein. In general, the methods may be performed preferably by a certain hardware device.

While the present disclosure has been described above with respect to exemplary embodiments thereof, it will be apparent to those skilled in the art that various changes and modifications may be made without departing from the spirit and scope of the present disclosure defined in the following claims.

What is claimed is:

1. A mutual authentication method performed by an electric vehicle (EV) for enabling plug-and-charge (PnC) charging of the EV through communication with a charging station (CS) device, the method comprising:

receiving, from the CS device, a supply equipment communication controller (SECC) certificate chain including a SECC Certificate during a transport layer security (TLS) session establishment;

authenticating an SECC associated with the CS device by verifying the SECC Certificate;

providing the CS device with an EV certificate chain including an EV Certificate of the EV to allow the CS device to authenticate the EV by verifying the EV Certificate during the TLS session establishment, thereby resulting in mutual authentication with the CS device during the TLS session establishment based on an authentication result of the CS device at the EV and an authentication result of the EV at the CS device; and transmitting a service request to the CS device after the mutual authentication, wherein a service requested by the EV in the service request is authorized in an application layer based on the mutual authentication during the TLS session establishment, including skipping one or more of EV identification or EV authentication in the application layer based on the mutual authentication during the TLS session establishment.

2. The mutual authentication method of claim 1, wherein receiving, from the CS device, the SECC certificate chain comprises:

providing the CS device with a list of at least some RootCA Certificates maintained in the EV, wherein the SECC Certificate is verified by using a first RootCA Certificate included in the list as a trust anchor.

3. The mutual authentication method of claim 1, wherein the EV certificate chain further includes at least one EV series SubCA Certificate issued based on an Original Equipment Manufacturer (OEM) RootCA Certificate issued by an OEM RootCA.

4. The mutual authentication method of claim 3, wherein the verification result for the EV Certificate is determined in the CS device by verifying the EV certificate using the at least one EV series SubCA Certificate along with a V2G RootCA Certificate or the OEM RootCA Certificate stored in a storage of the CS device.

5. A mutual authentication method performed by a charging station (CS) device for allowing plug-and-charge (PnC) charging of an electric vehicle (EV) through communication with the CS device, the method comprising:

providing the EV with a supply equipment communication controller (SECC) certificate chain including a SECC Certificate to allow the EV to authenticate the CS device by verifying the SECC Certificate during a transport layer security (TLS) session establishment;

receiving, from the EV, an EV certificate chain including an EV Certificate of the EV and authenticating the EV by verifying the EV Certificate during the TLS session establishment, thereby resulting in mutual authentication with the EV during the TLS session establishment based on an authentication result of the CS device at the EV and an authentication result of the EV at the CS device;

receiving a service request from the EV after the mutual authentication; and authorizing the service request by the EV with the service request in an application layer based on the mutual authentication during the TLS session establishment, including skipping one or more of EV identification or EV authentication in the application layer based on the mutual authentication during the TLS session establishment.

6. The mutual authentication method of claim 5, wherein authenticating the EV comprises:

receiving a list of at least some RootCA Certificates maintained in the EV, wherein the SECC Certificate is verified by using a first RootCA Certificate included in the list as a trust anchor.

7. The mutual authentication method of claim 5, wherein the EV certificate chain further includes at least one EV series SubCA Certificate issued based on an Original Equipment Manufacturer (OEM) RootCA Certificate issued by an OEM RootCA.

8. The mutual authentication method of claim 7, wherein the verification result for the SECC Certificate is determined in the EV by verifying the SECC certificate using at least one charging device series SubCA Certificate and a V2G RootCA Certificate stored in a storage of the EV.

9. The mutual authentication method of claim 5, wherein, during the operation of authenticating the EV, verifying the EV Certificate and the mutual authentication between the EV and the CS device are performed only when the EV certificate chain is received from the EV, wherein, when the EV certificate chain is not received from the EV, a verification of the EV Certificate is not performed while a verification of the SECC Certificate is performed by the EV so as to carry out a one-way TLS.

10. The mutual authentication method of claim 9, wherein, when the EV certificate chain is not received from the EV, a communication with the EV is terminated without generating a symmetric key and without transmitting and receiving messages encrypted by the symmetric key to and from the EV.

11. A charging station (CS) device configured to provide plug-and-charge (PnC) charging to an electric vehicle (EV) through communication with the EV, comprising:

a processor coupled to a memory and configured to execute program instructions stored in the memory, wherein the processor is further configured to:

provide the EV with a supply equipment communication controller (SECC) certificate chain including a SECC Certificate to allow the EV to authenticate the CS device by verifying the SECC Certificate during a transport layer security (TLS) session establishment;

receive, from the EV, an EV certificate chain including an EV Certificate of the EV and authenticate the EV by verifying the EV Certificate during the TLS session establishment, thereby resulting in mutual authentication with the EV during the TLS session establishment based on an authentication result of the CS device at the EV and an authentication result of the EV at the CS device;

receive, from the EV, a service request from the EV after the mutual authentication; and authorize the service request by the EV with the service request in an application layer based on the mutual authentication during the TLS session establishment, including skipping one or more of EV identification or EV authentication in the application layer based on the mutual authentication during the TLS session establishment.

12. The charging station device of claim 11, wherein the processor is further configured to:

receive a list of at least some RootCA Certificates maintained in the EV, wherein the SECC Certificate is verified by using a first RootCA Certificate included in the list as a trust anchor.

13. The charging station device of claim 11, wherein the EV certificate chain further includes at least one EV series SubCA Certificate issued based on an Original Equipment Manufacturer (OEM) RootCA Certificate issued by an OEM RootCA.

14. The charging station device of claim 13, wherein the verification result for the SECC Certificate is determined in the EV by verifying the SECC certificate using at least one charging device series SubCA Certificate and a V2G RootCA Certificate stored in a storage of the EV.

15. The charging station device of claim 11, wherein the processor is further configured to:

when the EV certificate chain is not received from the EV, terminate a communication with the EV without generating a symmetric key and transmitting and receiving messages encrypted by the symmetric key to and from the EV.

* * * * *